US006962220B2

(12) United States Patent
Takenaka et al.

(10) Patent No.: US 6,962,220 B2
(45) Date of Patent: Nov. 8, 2005

(54) LEG JOINT ASSIST DEVICE FOR LEG TYPE MOVABLE ROBOT

(75) Inventors: Toru Takenaka, Wako (JP); Hiroshi Gomi, Wako (JP); Kazushi Hamaya, Wako (JP); Yoshinari Takemura, Wako (JP); Takashi Matsumoto, Wako (JP); Takahide Yoshiike, Wako (JP); Yoichi Nishimura, Wako (JP); Kazushi Akimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 28 days.

(21) Appl. No.: 10/490,802

(22) PCT Filed: Sep. 24, 2002

(86) PCT No.: PCT/JP02/09757

§ 371 (c)(1),
(2), (4) Date: Mar. 25, 2004

(87) PCT Pub. No.: WO03/028960

PCT Pub. Date: Apr. 10, 2003

(65) Prior Publication Data

US 2004/0255711 A1    Dec. 23, 2004

(30) Foreign Application Priority Data

Sep. 27, 2001    (JP)    ............................. 2001-298677

(51) Int. Cl.$^7$ ............................................. G06F 19/00
(52) U.S. Cl. ...................... 180/8.6; 700/260; 901/1; 901/9; 901/2; 318/568.12; 180/8.1; 74/490.01
(58) Field of Search .................... 180/8.1, 8.5, 8.6; 901/1, 2, 9, 46; 700/245, 246, 254, 260, 261; 318/568.11, 568.12, 568.16, 568.2; 74/490.01, 74/490.03, 490.05

(56) References Cited

U.S. PATENT DOCUMENTS

| 5,808,433 | A  | * | 9/1998  | Tagami et al. | ......... 318/568.11 |
| 6,401,846 | B1 | * | 6/2002  | Takenaka et al. | ............ 180/8.6 |
| 6,564,888 | B1 | * | 5/2003  | Gomi et al. | ................. 180/8.6 |
| 6,802,382 | B2 | * | 10/2004 | Hattori et al. | .................. 901/1 |
| 2004/0261561 | A1 | * | 12/2004 | Takenaka et al. | ......... 74/490.01 |

FOREIGN PATENT DOCUMENTS

| JP | 11-300660   | 11/1999 |
| JP | 2001-198864 | 7/2001  |
| JP | 2001-287177 | 10/2001 |

* cited by examiner

*Primary Examiner*—Matthew Luby
(74) *Attorney, Agent, or Firm*—Rankin, Hill, Porter & Clark LLP

(57) ABSTRACT

An assist device that applies an auxiliary driving force to a joint in parallel with a driving force of a joint actuator between a thigh portion and a crus portion, which are a pair of link members of a leg. The assist device generates the auxiliary driving force by use of spring device, such as a solid spring or an air spring. A member supporting a rod member connected to the spring device is provided with a device for transmitting a bending and stretching motion of the leg at the joint (a relative displacement motion between the thigh portion and the crus portion) to the spring device to generate an elastic force of the spring device, and for discontinuing the transmission of the bending and stretching motion to the spring device. This transmitting device is controlled in accordance with a gait of a robot. Thus, a burden on the joint actuator is reduced where necessary and favorable utilization efficiency of energy can be stably ensured.

14 Claims, 26 Drawing Sheets

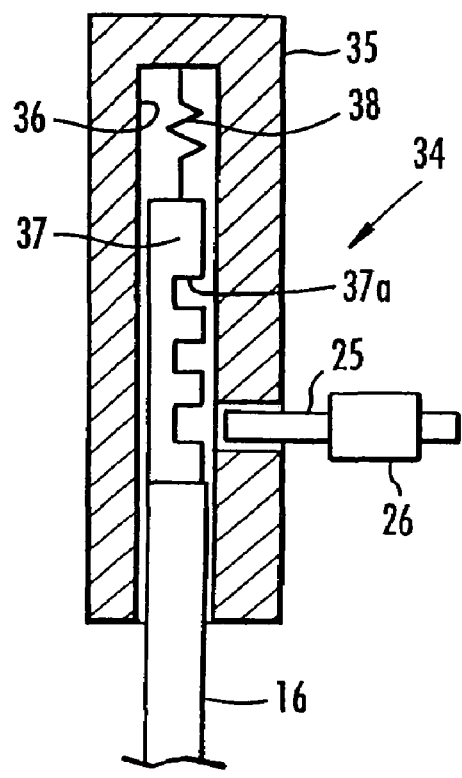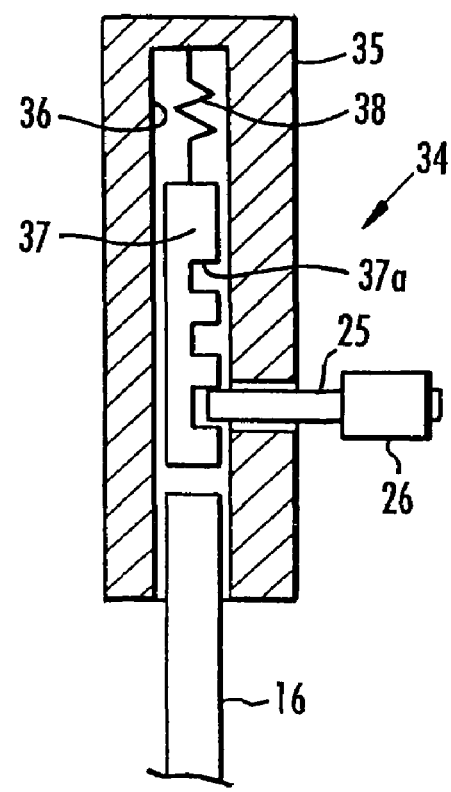

LEG JOINT ASSIST DEVICE FOR LEG TYPE MOVABLE ROBOT

TECHNICAL FIELD

The present invention relates to a leg joint assist device which generates an auxiliary driving force to a joint of a leg of a legged mobile robot such as a biped mobile robot, to assist a joint actuator which is for driving the joint.

BACKGROUND ART

In a legged mobile robot with a plurality of legs, each of the legs is configured by sequentially connecting a plurality of link members through a plurality of joints from a body. For example, in a biped mobile robot with two legs like a human, each of the legs is configured by sequentially connecting the link members, which correspond to a thigh portion, a crus portion, and a foot portion, through a hip joint, a knee joint, and an ankle joint, respectively, from a body of the robot. In addition, in the legged mobile robot of this kind, a motion of each of the legs for moving the robot is produced by applying a driving force (torque) to each of the joints of each of the legs by using a joint actuator such as an electric motor.

Incidentally, in the mobile robot of this kind, when, for example, a movement speed thereof is increased, forces (moment) acting on the joints of each of the legs are likely to be relatively large in a foot landing state of each of the legs (a state of a supporting leg period of each of the legs), due to floor reaction forces or the like. Consequently, driving forces (torque), which should be generated to the joint actuators to resist the forces, are likely to be relatively large. For example, in a case of allowing the biped mobile robot to run with a gait (a motion pattern of legs) similar to the gait of a running human, the driving force to be generated to the joint actuator of the knee joint becomes large, particularly in a supporting leg period of each of the legs, according to the knowledge of the inventor and the like. In this case, when the joint actuator is an electric motor, the aforementioned driving force is generated by a regenerative operation or a powering operation of the electric motor. With any of these operations, however, it is required to energize the electric motor or a power source such as a battery with a high current. Thus, an energy loss by Joule heat or the like is likely to be large. Further, since the electric motor with a large capacity is required, the size and weight of the electric motor become large.

Meanwhile, as disclosed in Japanese Patent Laid-Open Publication No. 2001-198864 (especially FIG. 9 of this publication), for example, a biped mobile robot is known in which a spring is provided between two link members (a thigh portion and a crus portion) connected by a knee joint of each leg.

While moving horizontally, this biped mobile robot converts kinetic energy in the horizontal direction of the robot into elastic energy of the spring and stores the elastic energy, thus producing a jumping motion of the robot by the use of the elastic energy. In the biped mobile robot provided with the springs as above, a part of a driving force to be generated in each of the knee joints is provided by the elastic force of the spring during a part of the period when the robot is in the running motion or the like. Thus, a burden on the joint actuators of the knee joints can be reduced. However, in this biped mobile robot, the elastic force of the spring is always acting between the thigh portion and the crus portion of each of the legs. Therefore, while the biped mobile robot is moving, a situation occurs where the elastic force of the spring acts in an opposite direction to the driving force which should be generated in each of the knee joints. In such a situation, a driving force generated to the joint actuator of each of the knee joints becomes unnecessarily large. As a result, it becomes difficult to improve utilization efficiency of the total energy of the robot.

The present invention was accomplished in light of the above-described circumstances, and it is an object of the present invention to provide a leg joint assist device for a legged mobile robot, which is enabled to reduce burdens on joint actuators as necessary and to stably ensure favorable utilization efficiency of energy.

DISCLOSURE OF THE INVENTION

A novel leg joint assist device for a legged mobile robot is a leg joint assist device for generating an auxiliary driving force on a specific joint of a legged mobile robot in parallel with a driving force of a joint actuator driving the specific joint, the robot comprising a plurality of legs, extending from a body, configured by connecting a plurality of link members sequentially from a body side through the plurality of joints, wherein at least one joint amongst a plurality of the joints of each of a plurality of the legs is defined as the specific joint in the legged mobile robot, the leg joint assist device comprising: spring means, provided to be able to transmit a relative displacement motion of a pair of the link members connected by the specific joint, the relative displacement motion being caused by actuation of the specific joint, for generating the auxiliary driving force while storing elastic energy in synchronization with the relative displacement motion in a state where transmission of the relative displacement motion is continued, and for restoring a state where the elastic energy is released in a state where transmission of the relative displacement motion is discontinued; motion transmission continuation/discontinuation means for continuing and discontinuing transmission of the relative displacement motion of the pair of link members to the spring means; and control means for controlling continuation/discontinuation of transmission of the relative displacement motion to the spring means by the motion transmission continuation/discontinuation means, depending on a state of motion of each of the legs.

According to the present invention described above, the leg joint assist device includes the motion transmission continuation/discontinuation means for continuing/discontinuing transmission of the relative displacement motion of the pair of link members, caused by the actuation of the specific joint, to the spring means. Further, in a state where transmission of the relative displacement motion of the pair of link members is discontinued, the spring means restores the state where the elastic energy is released (a state equivalent to a natural length state of a coiled spring). Thus, by controlling the motion transmission continuation/discontinuation means by use of the control means depending on the state of motion of each of the legs, it becomes possible to cause the spring means to generate the auxiliary driving force in a state where the auxiliary driving force by the spring means is required (for example, a state where a driving force which should act on the specific joint is relatively large and the spring means can generate the auxiliary driving force in the same direction to the driving force). It also becomes possible to prevent the spring means from generating the auxiliary driving force in a state other than the above.

Hence, according to the present invention, a burden on the joint actuator can be reduced when necessary. As a result, it becomes possible to allow the legged mobile robot to move with various kinds of gaits while using a relatively small joint actuator. In addition, due to the relative displacement motion of the pair of link members, the spring means stores the elastic energy which generates the auxiliary driving force. Thus, it becomes possible that the auxiliary driving force is generated while effectively utilizing kinetic energy of the robot. As a result, utilization efficiency of the entire energy of the robot can be improved.

Note that, in a biped mobile robot having two legs like a human, it is preferred that the specific joint be a knee joint.

In the invention described above, it is preferred that the control means control the motion transmission continuation/discontinuation means to discontinue transmission of a bending and stretching motion of the pair of link members to the spring means at least during a first predetermined period in a state where each of the legs is lifted off a floor. In general, the driving force to be generated at each of the joints of each of the legs is relatively small in the state where the each of the legs is lifted off the floor (a state of free leg period of each of the legs). If the auxiliary driving force by the spring means is generated in such a state, the auxiliary driving force becomes larger than the driving force originally required for the specific joint. This is likely to result in a situation where a further excessive driving force must be generated to the joint actuator of the specific joint, in order to reduce the auxiliary driving force. Therefore, in the present invention, transmission of the relative displacement motion to the spring means is discontinued at least during the first predetermined period in the state where each of the legs is lifted off the floor, so that the auxiliary driving force by the spring means is not generated. Thus, the excessive driving force is not generated in the joint actuator, thereby reducing energy consumed by the joint actuator. Further, the auxiliary driving force by the spring means is not generated during the first predetermined period in the state where each of the legs is lifted off the floor. Thus, a posture of each of the legs is not affected by the spring means, and thereby the state of the posture of each of the legs is stably controlled to be in a desired state of the posture.

Moreover, in the present invention, preferably, while the legged mobile robot is moving with a predetermined gait which has been decided in advance, the control means controls the motion transmission continuation/discontinuation means to continue transmission of the bending and stretching motion of the pair of link members to the spring means at least during a second predetermined period in a state where each of the legs lands on the floor. Specifically, the auxiliary driving force by the spring means is not necessarily always generated in the state where each of the legs lands on the floor while the legged mobile robot is moving. Basically, it is preferred that the auxiliary driving force be generated under a situation where the driving force to be generated to the specific joint of each of the legs becomes relatively large. Therefore, the relative displacement motion is transmitted to the spring means at least during the second predetermined period in the state where each of the legs lands on the floor, while the robot is moving with the predetermined gait. Thus, the auxiliary driving force can be generated by the spring means only in the situation where the auxiliary driving force is required.

In this case, it is preferred that the second predetermined period in the state where each of the legs lands on the floor be determined such that relative displacement amounts between the pair of link members at start time and stop time of the second predetermined period are approximately the same. Specifically, if the relative displacement amounts at the start time and the stop time of the second predetermined period are largely different from each other, the spring means cannot entirely release the elastic energy at the stop time of the second predetermined period. Therefore, since the auxiliary driving force of the spring means is not sufficiently small yet, the auxiliary driving force to be acted on the specific joint by the spring means becomes discontinuous at the stop time of the second predetermined period. In the case like this, an inappropriate variation of the behavior (a non-smooth change in the behavior) of each leg of the robot occurs easily. Additionally, free vibration occurs from the stop time of the second predetermined period, especially when the spring means is a solid spring such as a coiled spring. Thus, when starting transmission of the relative displacement motion of the pair of link members to the spring means thereafter, the auxiliary driving force which is acted on the specific joint by the spring means is discontinuously changed and the like. Therefore, the auxiliary driving force may become inappropriate. Hence, in the present invention, the second predetermined period is determined such that the relative displacement amounts between the pair of link members at the start time and stop time of the second predetermined period become approximately the same. Accordingly, the spring means is in the state where the elastic energy is released (a state where the auxiliary driving force of the spring means is about "0") at the stop time of the second predetermined period during which the auxiliary driving force by the spring means is generated. Therefore, it is possible to avoid a situation where the auxiliary driving force to be acted on the specific joint by the spring means discontinuously changes at the stop time of the second predetermined period at which transmission of the relative displacement motion to the spring means stops. It is also possible to avoid a situation where free vibration occurs from the stop time of the second predetermined period. Consequently, the legs of the robot can be actuated with smooth behavior.

In the present invention in which the auxiliary driving force by the spring means is generated in the state where each of the legs lands on the floor while the robot is moving with the predetermined gait as mentioned above, it is preferable that means for controlling a driving force of the joint actuator is provided such that, while the motion transmission continuation/discontinuation means is continuing transmission of the relative displacement motion of the pair of link members to the spring means, a sum of the auxiliary driving force by the spring means and the driving force of the joint actuator becomes a desired driving force determined to follow a desired gait of the legged mobile robot.

According to the above, the total driving force acting on the specific joint is controlled to be the desired driving force determined to follow the desired gait of the robot (a required value of the driving force which should be generated to the specific joint to allow the gait of the robot to follow the desired gait) regardless of whether the auxiliary driving force by the spring means is being generated. Thus, the operation of the robot can be performed smoothly.

Moreover, the means for controlling the driving force of the joint actuator as mentioned above estimates the auxiliary driving force by the spring means based on a variation of the relative displacement amount between the pair of link members from the start time of the second predetermined period and characteristic data of the auxiliary driving force of the spring means, which is obtained in advance.

Specifically, the auxiliary driving force changes depending on the variation of the relative displacement amount between the pair of link members from the start time of the second predetermined period. In addition, the form of the variation depends on the characteristics of the spring means. Therefore, by estimating the auxiliary driving force by the spring means in the above-mentioned manner, an appropriate estimated value of the auxiliary driving force can be obtained. Consequently, the driving force of the joint actuator can be appropriately controlled. Note that the auxiliary driving force by the spring means can be detected directly by the use of a force sensor or the like.

Moreover, in the present invention, the spring means may be a solid spring such as a coiled spring, a leaf spring, a torsion spring, a metal spring, rubber and the like, as a matter of course. However, it is preferred that the spring means be a gas spring which elastically generates the auxiliary driving force by compression and expansion of gas. Specifically, the gas spring unlikely to cause free vibration in comparison with the solid spring. Therefore, free vibration of the spring means can be prevented especially when transmission of the relative displacement motion to the spring motion is discontinued. Thus, when the transmission of the relative displacement motion to the spring means is re-started after transmission thereof has been discontinued, the desired auxiliary driving force of the spring means can be generated smoothly.

Moreover, in the present invention, it is preferred that the joint actuator be an electric motor. Specifically, in the present invention, the burden on the joint actuator of the specific joint can be reduced as described earlier. Therefore, a current flowing through the electric motor serving as the joint actuator can be small, and an energy loss due to Joule heat or the like can be minimized. In addition, the use of the electric motor as the joint actuator can realize smooth motion control of the legs of the robot. Furthermore, a vibration component of the motion of the legs caused by the spring means can be easily diminished by control of the electric motor, without providing a mechanical buffering device (damping device), especially in a state of generating the auxiliary driving force by the spring means. Thus, stable control of the motion of the robot can be smoothly performed.

BRIEF DESCRIPTION OF THE DRAWINGS

FIGS. 10(a) and 10(b) are cross sectional views showing a configuration of an essential part of an assist device in a third embodiment of the present invention;

BEST MODE FOR CARRYING OUT THE INVENTION

Figure 1:
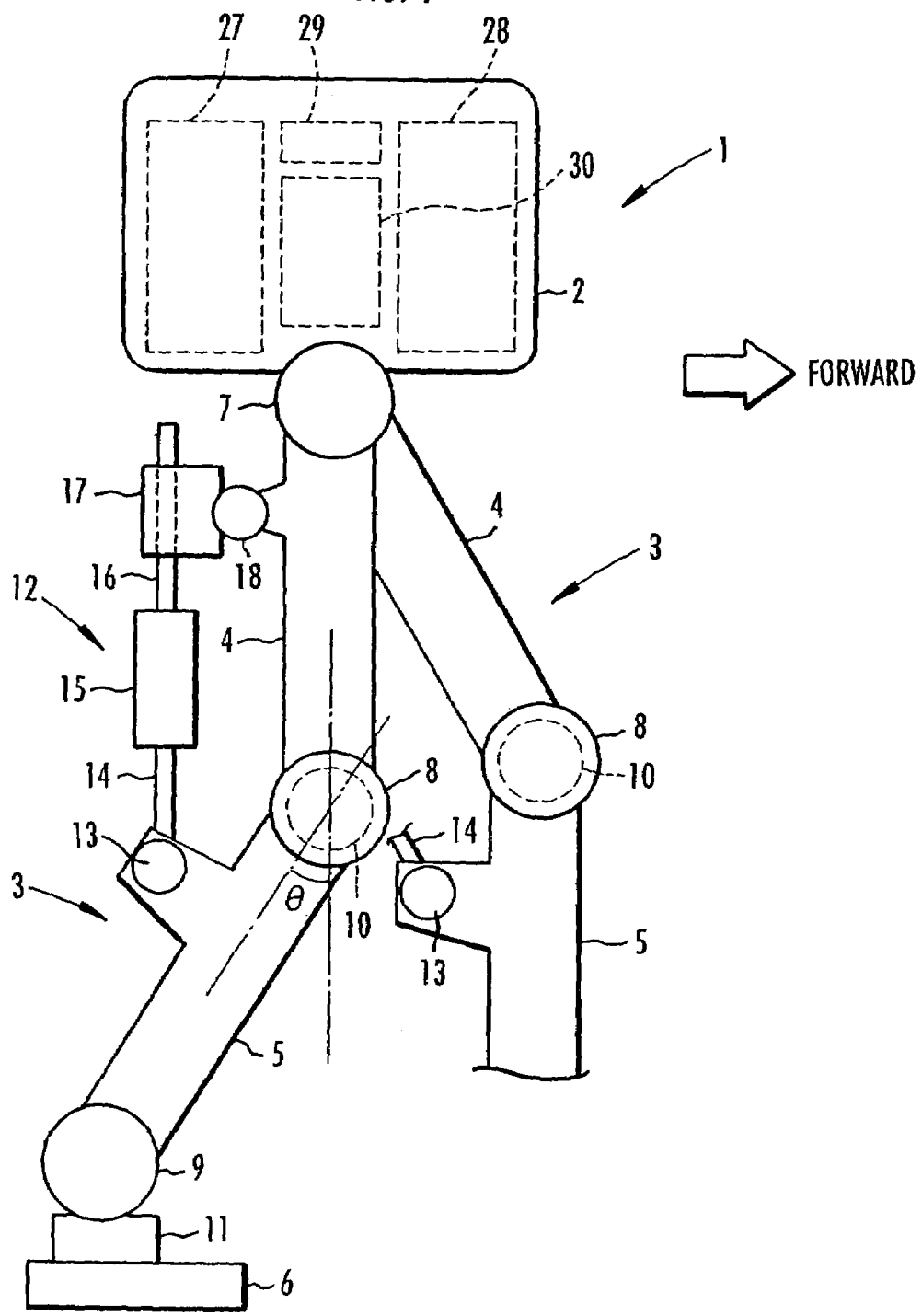
FIG. 1 is an explanatory view showing the entire structure of a legged mobile robot in a first embodiment of the present invention.
Figure 2:
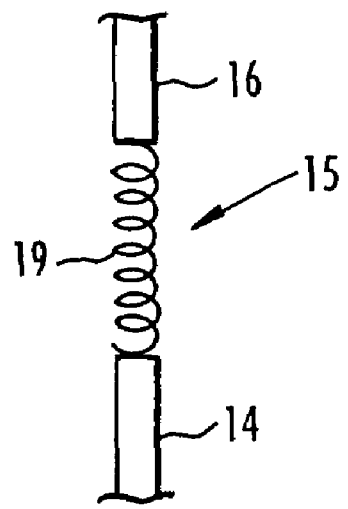
FIGS. 2(a) and 2(b) are explanatory views exemplifying spring means of an assist device provided in the robot in FIG. 1.
Figure 2:
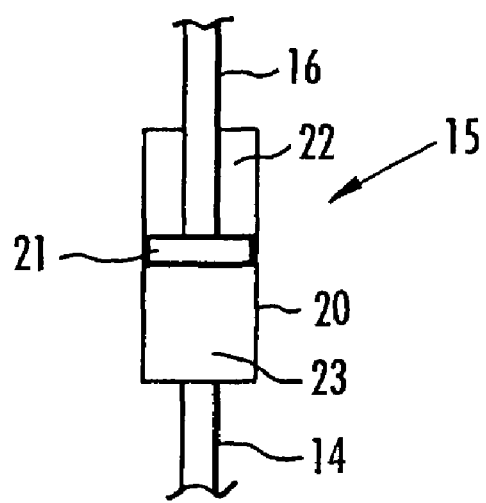
Figure 3:
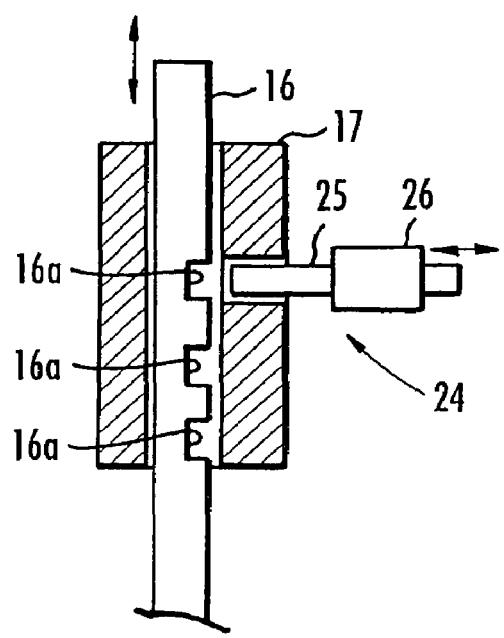
FIGS. 3(a) and 3(b) are cross sectional views showing a configuration of an essential part of the assist device provided in the robot in FIG. 1.
Figure 3:
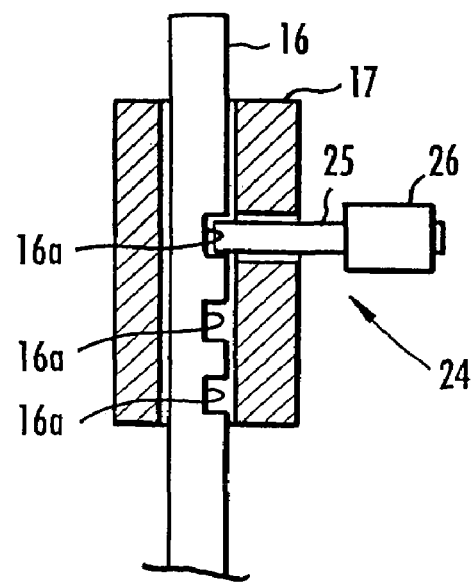

A first embodiment of the present invention is described with reference to FIGS. 1 to 8. FIG. 1 is a schematic view depicting a configuration of a biped mobile robot as the legged mobile robot of this embodiment. As illustrated, the robot 1 is provided with two legs 3 and 3 extending downward from a body 2. Note that these legs 3 and 3 have the same structure and thus one of the legs 3 (the forward-left leg 3 of the robot 1 in the figure) is shown only partially.

Similarly to the leg of a human, each of the legs 3 is configured by sequentially connecting a thigh portion 4, a crus portion 5, and a foot portion 6 through a hip joint 7, a knee joint 8, and an ankle joint 9, respectively, from the body 2. To be more specific, the thigh portion 4 of each of the legs 3 extends from the body 2 through the hip joint 7, the crus portion 5 is connected to the thigh portion 4 through the knee joint 8, and the foot portion 6 is connected to the crus portion 5 through the ankle joint 9. Note that respective ones of the thigh portion 4, the crus portion 5 and the foot portion 6 correspond to link members in this invention.

In this case, the hip joint 7 is enabled to have rotational motions about three axes in directions of front and back, right and left, and top and bottom of the robot 1. The knee joint 8 is enabled to have a rotational motion about one axis in the right and left direction. The ankle joint 9 is enabled to have rotational motions about two axes in the directions of front and back, and the right and left. Because of the rotation motions of each of the joints 7, 8 and 9, each of the legs 3 can have a motion which is almost the same as that of the leg of the human. In addition, the knee joint 8, for example, is provided with an electric motor 10 (hereinafter, referred to as a knee joint electric motor 10) as a joint actuator in order to perform the rotational motion about one axis in the right and left direction. Further, although not illustrated, the hip joint 8 is provided with three electric motors for performing the rotational motions about the three axes, respectively. The ankle joint 9 is provided with two electric motors for performing the rotational motions about two axes, respectively.

Note that, in this embodiment, each of the foot portions 6 is connected to the ankle joint 9 through a six-axis force sensor 11 in order to detect a floor reaction force (translational forces in three-axis directions of front and back, right and left, and top and bottom of the robot 1 and moments about the three axes) acting on each of the foot portions 6. Moreover, each of the joints 7, 8 and 9 is provided with an encoder (not shown) for detecting a rotation position thereof (specifically, a rotation angle of the electric motor of each of the joints 7 to 9).

In this embodiment, the knee joint 8 of each of the legs 3 is a specific joint in this invention, and an assist device 12 for applying an auxiliary driving force to the knee joint 8 as necessary is provided in each of the legs 3.

The assist device 12 is provided with a rod member 14 connected to the crus portion 5 through a free joint 13, a rod member 16 connected to the rod member 14 through spring means 15, and a rod insertion member 17 through which the rod member 16 is inserted to be movable in an axis direction thereof. The rod member 14, the spring means 15, the rod member 16 and the rod insertion member 17 as a whole extend upward almost along the thigh portion 4 from the free joint 13 of the crus portion 5. The circumference portion of the rod insertion member 17 is connected to the thigh portion 4 through a free joint 18.

Here, the spring means 15 is enabled to store elastic energy. For example, a solid spring which generates an elastic force by elastic deformation thereof or a gas spring which generates an elastic force by compression and expansion of gas such as air can be used as the spring means 15. The solid spring includes a coiled spring, a leaf spring, a torsion spring, rubber and the like. The gas spring includes a bag made of rubber or the like in which a gas such as air is sealed, a cylinder with a piston where the gas is sealed and the like. Further, the spring means 15 is connected to the rod members 14 and 16 so as to generate an elastic force corresponding to a change of spacing between these rod members 14 and 16.

To be more specific, when, for example, a coiled spring which is a solid spring is used as the spring means 15, both ends of a coiled spring 19 are joined to the rod members 14 and 16, respectively, as shown in FIG. 2(a). Alternatively, when, for example, a gas spring having a cylinder configuration is used as the spring means 15, the rod member 14 is joined to a cylinder 20 and the rod member 16 is joined to a piston 21 as shown in FIG. 2(b). The piston 21 is slidable within the cylinder 20 in an axis direction thereof. Gas such as air is then sealed within gas chambers 22 and 23 formed within the cylinder 20 above and below the piston 21. Note that, in this case, the rod members 14 and 16 may be joined to the piston 21 and the cylinder 20, respectively, in reverse to the above. In addition, one of the gas chambers 22 and 23 within the cylinder 20 may be opened to, for example, the atmosphere.

Note that, in the description below, a state where the spring means 15 has released the elastic energy thereof (state where no elastic force is generated) is referred to as a natural length state of the spring means 15 as a matter of convenience.

As further shown in FIGS. 3(a) and 3(b), the foregoing assist device 12 is provided with a lock mechanism 24 which latches the rod member 16 so that the rod member 16 cannot move relative to the rod insertion member 17. This lock mechanism 24 corresponds to motion transmission continuation/discontinuation means in this invention and has the following configuration. In one side portion of the rod member 16, a plurality of recesses 16a are provided at intervals in the longitudinal direction thereof (a movable direction of the rod member 16). Further, the rod insertion member 17 is provided with a latch pin 25 to be able to move forward and backward to the side portion of the rod member 16 having the above-mentioned recesses 16a. By the forward and backward movement, the latch pin 25 can be fitted into each of the recesses 16a of the rod member 16 as shown FIG. 3(b). In this case, the latch pin 25 is moved forward and backward by energization control of, for example, an electromagnetic solenoid 26. By fitting the latch pin 25 into the recess 16a, the lock mechanism 24 latches the rod member 16 so that the rod member 16 cannot move relative to the rod insertion member 17.

With the above-mentioned configurations of the assist device 12 and the lock mechanism 24, in the state where the latch pin 25 of the lock mechanism 24 is moved backward (state of FIG. 3(a)), the rod member 16 can be freely moved integrally with the spring member 15 and the rod member 14 in the axis direction of the rod member 16 (hereinafter, the above state is referred to as a free state) in synchronization with a bending and stretching motion of the thigh portion 4 and the crus portion 5 at the knee joint 8 (this motion corresponds to a relative displacement motion in this invention and hereinafter referred to as a knee bending and stretching motion). In this free state, the knee bending and stretching motion is not transmitted to the spring means 15, and the spring means 15 is kept in an almost natural length state. Therefore, in the free state, an elastic force is not applied to the knee joint 8 of the leg 3 from the spring means 15.

Alternatively, when the latch pin 25 is moved forward during the knee bending and stretching motion so that the latch pin 25 is fitted into one of the recesses 16a of the rod member 16, the rod member 16 is latched so as not to be moved relative to the rod insertion member 17 from when the latch pin 25 is inserted (hereinafter, this state is referred to as a locked state). In this locked state, the spring means 15 is compressed or extended from the natural length state by the knee bending and stretching motion. The spring means 15 then stores elastic energy and generates an elastic force. Thereafter, the elastic force acts on the knee joint 8 as a rotation force (auxiliary driving force) of the knee joint 8 in parallel with a rotation force of the knee joint 8 by the foregoing knee joint electric motor 10. In this case, the rotation force of the knee joint 8 by the spring means 15 (hereinafter, referred to as an auxiliary knee rotation force) depends on a variation of a bending angle θ between the thigh portion 4 and the crus portion 5 (hereinafter, referred to as a knee bending angle θ; see FIG. 1) from a knee bending angle at start time of the locked state (transition from the free state to the locked state) (hereinafter, referred to as a lock start knee bending angle).

Figure 4:
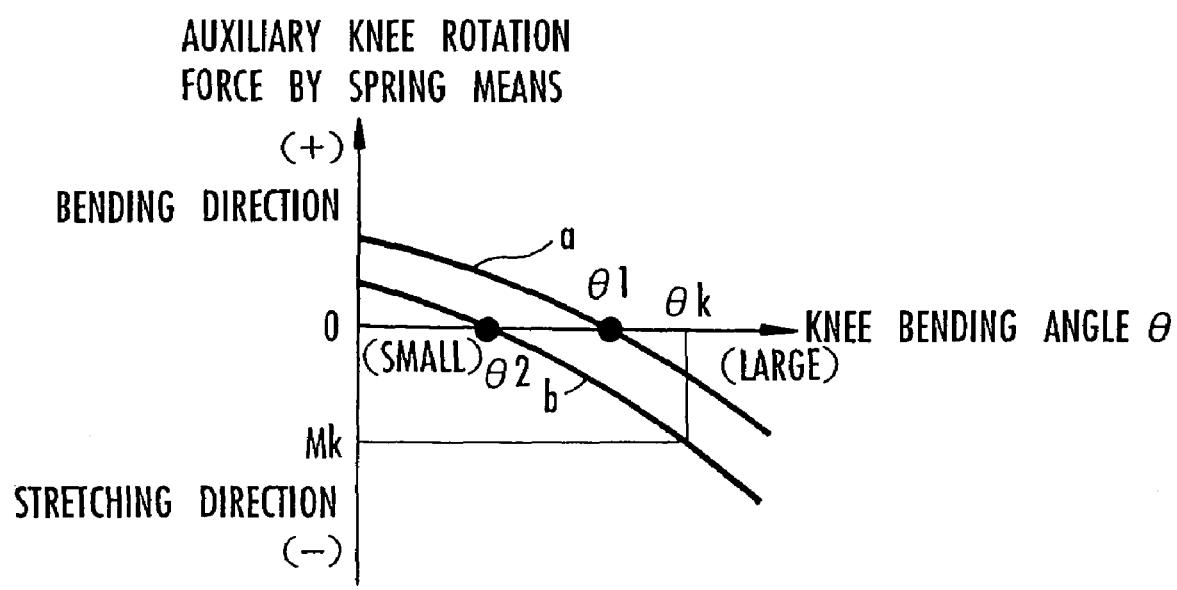
FIG. 4 is a diagram showing characteristics of the spring means provided in the robot in FIG. 1.

More specifically, referring to FIG. 4, if the lock start knee bending angle is "θ1," the auxiliary knee rotation force by the spring means 15 changes relative to the knee bending angle θ with, for example, characteristics shown by a solid line a in FIG. 4. Further, if the lock start knee bending angle is "θ2" (θ1>θ2), the auxiliary knee rotation force by the spring means 15 changes relative to the knee bending angle θ with characteristics shown by a solid line b in FIG. 4. Here, the knee bending angle θ in this embodiment is an inclination angle of the axis of the crus portion 5 with reference to the axis of the thigh portion 4 as shown in FIG. 1. The more the leg 3 bends at the knee joint 8, the larger the knee bending angle θ becomes. Moreover, the auxiliary knee rotation force by the spring means 15 at the knee joint 8 in a bending direction of the leg 3 is expressed by a positive value, and the same in a stretching direction of the leg 3 is expressed by a negative value. Therefore, when the knee bending angle θ is decreased from the foregoing lock start knee bending angle (in a motion in the stretching direction of the leg 3), the auxiliary knee rotation force by the spring means 15 increases in the bending direction of the leg 3. When the knee bending angle θ is increased from the lock start knee bending angle (in a motion in the bending direction of the leg 3), the auxiliary knee rotation force by the spring means 15 increases in the stretching direction of the leg 3. Furthermore, the smaller the lock start knee bending angle is, the larger the auxiliary knee rotation force at each of the knee bending angles θ becomes in the stretching direction of the leg 3. In addition, the auxiliary knee rotation force by the spring means 15 at the lock start knee bending angle is almost "0."

Note that the characteristics of the change of the auxiliary knee rotation force (curves of the solid lines a and b in FIG. 4) relative to the change of the knee bending angle θ are uniform at any lock start knee bending angle. Moreover, in the foregoing free state, the spring means 15 is in the natural length state as mentioned earlier. Thus, the auxiliary knee rotation force by the spring means 15 is almost "0" at any knee bending angle θ. Furthermore, in this embodiment, the aforementioned knee bending angle θ corresponds to a relative displacement amount between the thigh portion 4 and the crus portion 5 as a pair of link members.

Referring back to FIG. 1, mounted within the body 2 of the robot 1 are: a control unit 27 which performs, for example, operation control of the respective joints 7, 8 and 9 of each of the legs 3; a storage device 28 as a power source of the electric motors of the respective joints 7, 8 and 9, and the like; an inclination sensor 29 which detects an inclination angle of the body 2; a motor driver circuit 30 for controlling energizing of the respective electric motors; and the like. Note that the inclination sensor 29 is configured by using a gyro sensor, an accelerometer or the like. Moreover, the storage device 28 is configured by a battery (secondary battery), a condenser or the like.

Figure 5:
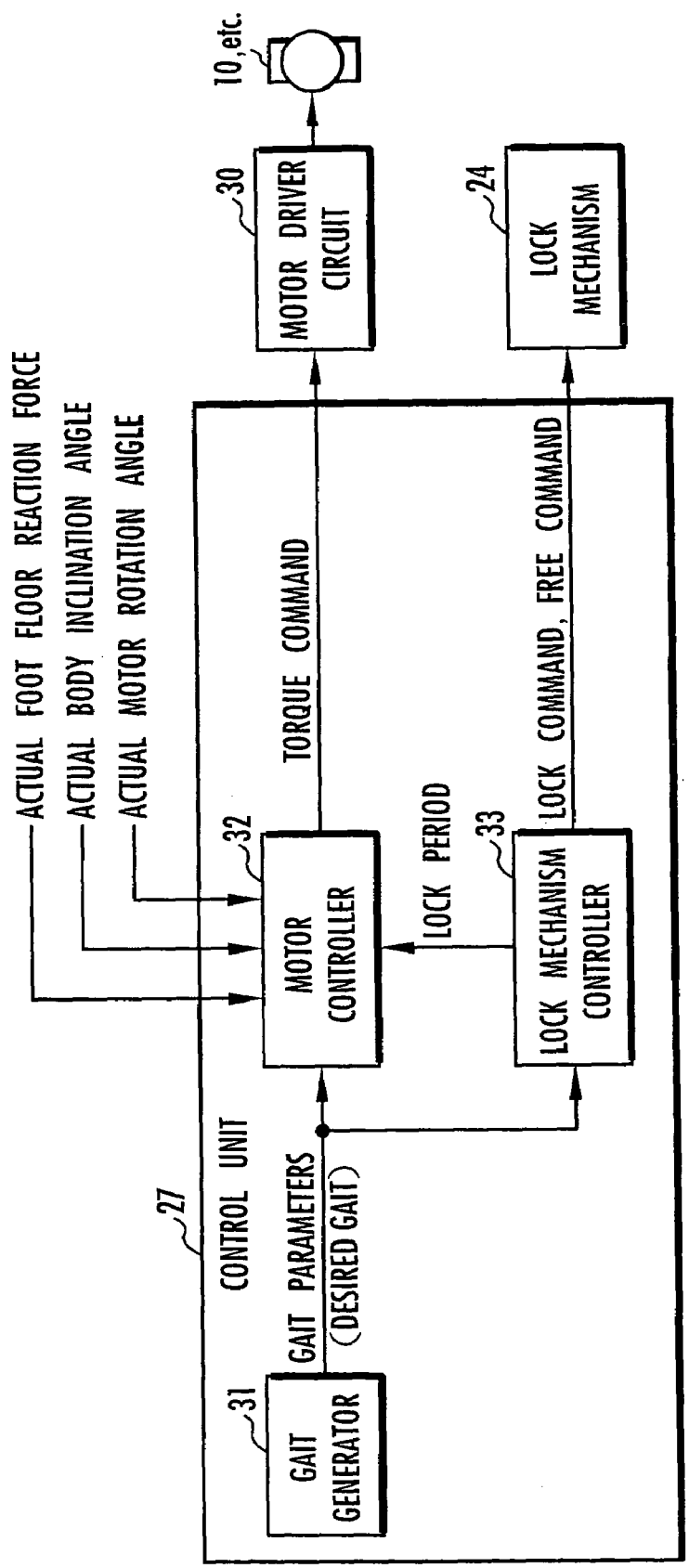
FIG. 5 is a block diagram showing a functional configuration of a control unit provided in the robot in FIG. 1.

The control unit 27 is configured by electronic circuits including a microcomputer and the like. As shown in FIG. 5, the control unit 27 is provided with a gait generator 31, a motor controller 32, and a lock mechanism controller 33 as functional constituents thereof.

In each step (every time a supporting leg changes) while the robot 1 is moving, the gait generator 31 decides gait parameters (length of step, walking cycle, motion mode and the like) which define desired gaits of both legs 3 and 3 of the robot 1 (desired forms of the motions of both legs 3 and 3), corresponding to a command from the outside, teaching data (data for a planned movement) which has been already set, or the like. Further, based on the gait parameters, the gait generator 31 generates a desired gait (a desired instantaneous gait) for each predetermined control cycle. Here, the gait parameters generated by the gait generator 31 in this embodiment are parameters which define the desired gaits and the like for permitting the robot 1 to perform a normal walking motion and the same for permitting the robot 1 to perform a running motion similar to a human running motion. The desired gait includes, for example: desired values of position and posture of the body 2 of the robot 1 (hereinafter, referred to as desired body position/posture); desired values of position and posture of each of the foot potions 6 of the robot 1 (hereinafter, referred to as desired foot position/posture); a desired value of a resultant force (total floor reaction force) of floor reaction forces (translation forces and moment) acting on the respective foot portions 6 and 6 (hereinafter, referred to as desired total floor reaction force); and a desired position of so-called ZMP (Zero Moment Point) (hereinafter, referred to as a desired ZMP) as a point of action of the total floor reaction force. Note that further details of constituents of the aforementioned desired gait are provided by the applicant of the application concerned, in Japanese Patent Laid-Open Publication No. Heisei 11-300660, for example. Thus, detailed description thereof is omitted herein. Moreover, the content of the desired gait is not limited to that disclosed in the abovementioned publication, as long as it expresses a desired form of the motion of the robot 1.

The lock mechanism controller 33 has a function to control the lock mechanism 24 of the foregoing assist device 12 to be in the aforementioned locked state or the free state. Corresponding to the desired gait (to be more specific, the gait parameters defining the desired gait) generated by the gait generator 31, this lock mechanism controller 33 decides a period during which the lock mechanism 24 is in the locked state (this state corresponds to a second predetermined period in this invention, and hereinafter referred to as a lock period) or a period during which the lock mechanism 24 is in the free state (this state corresponds to a first predetermined period in this invention, and hereinafter referred to as a free period) as described later. During the decided lock period, the lock mechanism controller 33 outputs a lock command to the lock mechanism 24 in order to direct the lock mechanism 24 to the locked state. Alternatively, in the decided free period (a period except the lock period), the lock mechanism controller 33 outputs a free command to the lock mechanism 24 in order to direct the lock mechanism 24 to the free state. Here, in this embodiment, the lock mechanism 24 is actuated by moving the latch pin 25 forward and backward by the use of the electromagnetic solenoid 26 as described earlier. Therefore, to be more specific, the abovementioned lock command and the free command are commands for energization control of the aforementioned electromagnetic solenoid 26 of the lock mechanism 24. Note that the lock mechanism controller 33 corresponds to control means in this invention.

The motor controller 32 sequentially controls the electric motors of the respective joints 7, 8 and 9, including the foregoing knee joint electric motor 10 (specifically, sequentially controls rotation angles of the electric motors). As described later, this motor controller 32 sequentially generates torque commands (specifically, command values of the current to energize the electric motors) which define torque to be generated in the respective electric motors, based on the desired gait generated by the gait generator 31, an actual inclination angle of the body 2 detected by the foregoing inclination sensor 29, actual rotation angles of the respective joints 7, 8 and 9 of the leg 3 detected by using the unillustrated encoders, an actual floor reaction force of each of the foot portions 6 detected by the foregoing six-axis force sensor 11, data of the foregoing lock period (or the free period) decided by the foregoing lock mechanism controller 33, and the like. Thereafter, the motor controller 32 outputs the generated torque commands to the motor driver circuit 30, causing the respective electric motors to generate torque in accordance with the torque commands, through the motor driver circuit 30.

Next, actuation of a system of this embodiment is described. The aforementioned control unit 27 performs a predetermined initialization processing such as initialization of a timer and the like, and thereafter executes processing of the flowchart in FIG. 6 for each predetermined control cycle (for example, 50 ms) which is set in advance. Specifically, the control unit 27 first determines whether it is a switch moment of the gait of the robot 1 (STEP 1). To be more specific, the switch moment of the gait is the instance of the supporting leg, one of the legs 3, switching to the other leg 3, while the robot 1 is moving. When the switch moment of the gait does not exist in STEP 1, the processing of the control unit 27 proceeds to a processing in STEP 3 which will be described later.

When it is a switching moment of the gait, in STEP 1, the control unit 27 causes the foregoing gait generator 31 to generate (renew) the gait parameters which define the desired gait of the robot 1, based on a motion command of the robot 1 given from the outside or the data for a planned movement set in advance (STEP 2). Here, the desired gait defined by the gait parameters generated by the gait generator 31 is a desired gait used until the next switch moment in the gait or the moment slightly after the next switch moment in the gait. Additionally, in this case, the desired gait defined by the gait parameters generated by the gait generator 31 is a desired gait of a running motion of the robot 1 (for example, a desired gait with which the robot 1 performs motions of the legs 3 and 3 with steps similar to those of a running human), in a case where the motion command, indicating that the robot 1 should perform a running motion, is given from the outside, or in a situation where the robot 1 should perform a running motion according to the data for a planned movement of the robot 1.

Next, the control unit 27 executes processings of STEPS 3 to 5 by use of the motor controller 32. The processings of STEPS 3 to 5 are for obtaining torque commands (hereinafter, referred to as basic torque commands) to the electric motors of the respective joints 7, 8 and 9, when the lock mechanism 24 of the assist device 12 is in the free state (where the auxiliary knee rotation force by the spring means 15 does not act on the knee joint 8). These torque commands are required in order to direct the motion of the robot 1 to follow the aforementioned desired gait. Note that the processings of STEP 3 to 5 have already been detailed by the applicant of the application concerned in Japanese Patent Laid-Open Publication No. Heisei 11-300660. Therefore, brief outlines of the processings of STEP 3 to 5 are provided in the following.

In STEP 3, the control unit 27 obtains a desired instantaneous gait based on the gait parameters currently generated by the gait generator 31. The desired instantaneous gait is the desired gait for each control cycle of processing of the control unit 27. To be more specific, the desired instantaneous gait includes the desired body position/posture, the desired foot position/posture, the desired total floor reaction force, and the desired ZMP, for each control cycle, as mentioned earlier. Note that, in the processing of STEP 3, a desired floor reaction force of each of the legs 3 for each control cycle as well as a point of action of the desired floor reaction force of the same are further obtained, based on the above-mentioned desired foot position/posture, the desired total floor reaction force, the desired ZMP and the like.

In STEP 4, the control unit 27 corrects the desired foot position/posture of the above-mentioned desired instantaneous gait by a composite-compliance operation processing. To be more specific, in this composite-compliance operation processing, obtained is a floor reaction force (moment) to be acted on the robot 1 in order to restore the actual inclination angle of the body 2 of the robot 1 (detected by the foregoing inclination sensor 29) to a desired inclination angle set by the aforementioned desired body position/posture (cause the deviation between the actual inclination angle and the desired inclination angle to be "0"). Thereafter, a resultant force of this floor reaction force (moment) and the aforementioned desired total floor reaction force is set as a desired value of the entire floor reaction force to be actually acted on the robot 1. Subsequently, the desired foot position/posture for each control cycle is corrected so that a resultant force of the actual floor reaction force of each of the foot portions 6, detected by the six-axis sensor 11 of each of the legs 3, follows the desired value. This kind of composite-compliance operation processing is for ensuring autonomous stability of the posture of the robot 1.

In STEP 5, the control unit 27 obtains the basic torque commands to the respective electric motors of the joints 7, 8 and 9 of each of the legs 3 of the robot 1. To be more specific, in this processing, desired rotation angles of the respective joints 7, 8 and 9 of each of the legs 3 of the robot 1 are obtained by an inverse kinematics calculation processing based on a model of the robot 1 (a rigid body link model), using the desired body position/posture in the desired instantaneous gait, the desired foot position/posture corrected in STEP 4 as mentioned above, and the like. Thereafter, the torque commands to the electric motors of the respective joints 7, 8 and 9 are obtained so that actual rotation angles of the respective joints 7, 8 and 9 (detected by the unillustrated encoder provided in each of the joints 7, 8 and 9) follow these-desired rotation angles.

In this case, for example, the torque command for the knee joint electric motor 10 of each of the legs 3 is obtained by the following equation (1) using a deviation $\Delta\theta$ between the desired rotation angle of the knee joint 8 (desired value of the knee bending angle $\theta$) and an actual rotation angle of the knee joint 8 (detected value of the knee bending angle $\theta$), and torque Tff of the electric motor 10 (hereinafter, referred to as a reference torque Tff) required to generate the aforementioned desired floor reaction force to the leg 3.

$$\text{Basic torque command} = Kp \cdot \Delta\theta + Kv \cdot (d\Delta\theta/dt) + Tff \quad (1)$$

Note that the reference torque Tff used for the calculation of the equation (1) is obtained by the inverse kinematics calculation processing (inverse dynamics calculation processing) based on a model of the robot 1, using the desired body position/posture, the desired foot position/posture, the desired floor reaction force to the leg 3, desired rotation angle acceleration of each of the joints 7, 8 and 9, and the like. Further, factors Kp and Kv of the equation (1) are gain coefficients set in advance. A factor $d\Delta\theta/dt$ is the time derivative of the deviation $\Delta\theta$.

Here, the first and second terms on the right hand side of the equation (1) are feedback control terms corresponding to the deviation $\Delta\theta$. The third term on the right hand side thereof is a feed-forward control term for compensating an influence of the floor reaction force acting on the leg 3. The second term on the right hand side in particular is a term having a buffer function (damping function) which swiftly diminishes vibration relative to the desired value of the knee bending angle $\theta$.

The basic torque commands for the electric motors of the joints 7 and 9 other than the knee joint 8 are obtained in a similar manner to the above. As described earlier, the basic torque commands obtained in this manner are torque commands to the electric motors of the respective joints 7, 8 and 9, required to cause the motion of the robot 1 to follow the foregoing desired gait in a state where the auxiliary knee joint rotation force by the spring means 15 of the assist device 12 is not acting on the knee joint 8.

Next, in STEP 6, the control unit 27 causes the foregoing lock mechanism controller 33 to execute a processing for controlling the lock mechanism 24 of the assist device 12. This processing is performed as shown in the flowchart in FIG. 7. Specifically, the lock mechanism controller 33 first sets the lock period during which the lock mechanism 24 is in the locked state, based on the gait parameters currently set by the gait generator 31 (STEP 6-1). In this case, in the present embodiment, when the gait parameters are those which cause the robot 1 to perform, for example, a normal walking motion, the lock mechanism controller 33 directs the lock mechanism 24 to the free state (does not allow the auxiliary knee rotation force by the spring means 15 to act on the knee joint 8) over the entire period of the walking motion. Hence, the lock period is not set in this case.

On the other hand, when the gait parameters are those which cause the robot 1 to perform, for example, a running motion (running motion similar to that of a human), the lock period is set so as to direct the lock mechanism 24 to the locked state during a predetermined period of the gait of the robot 1, as described below.

Figure 8:
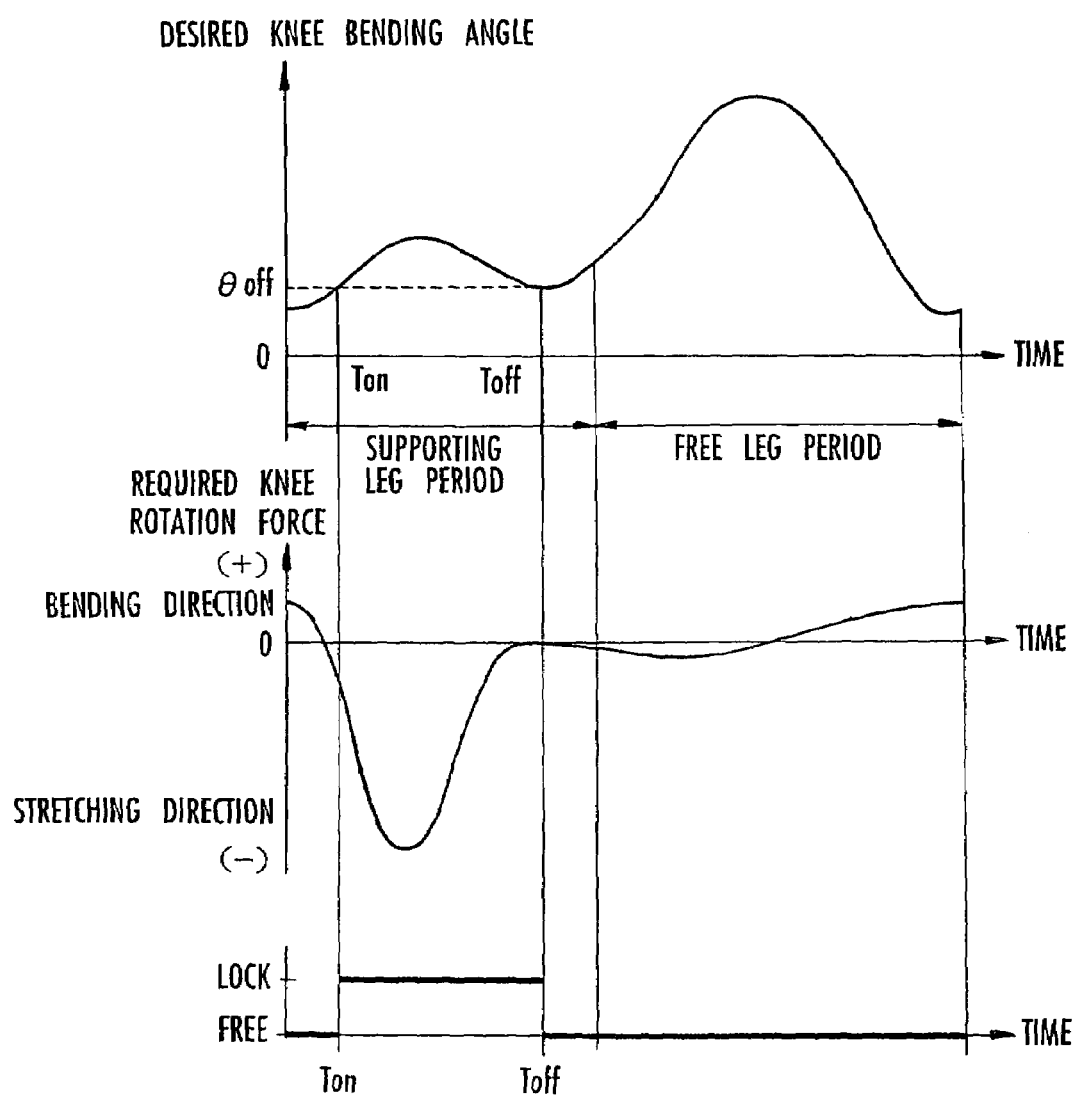
FIG. 8 is a diagram for explaining actuation of the assist device provided in the robot in FIG. 1.

Prior to specific description about setting of the lock period, description is provided, with reference to FIG. 8, regarding the desired rotation angle of the knee joint 8 (hereinafter, referred to as a desired knee bending angle) determined by the desired gait in the running motion of the robot 1 in this embodiment, and a rotation force to be acted on the knee joint 8 corresponding to the desired knee bending angle (hereinafter, referred to as a required knee rotation force). An upper diagram in FIG. 8 shows how the desired knee bending angle of the knee angle 8 of any one of the legs 3 and 3 changes with time during the running motion of the robot 1 (the running motion with footsteps similar to those in a normal running motion of a human). A middle diagram in FIG. 8 shows how the required knee rotation force corresponding to the desired knee bending angle in the upper diagram of FIG. 8 changes with time. Note that a lower diagram in FIG. 8 shows how the lock period is set, which will be described later.

When the robot 1 performs the running motion in a similar form to that of the normal running motion of a human, the desired knee bending angle increases (a bending degree of the leg 3 at the knee joint 8 increases) during the first half of a supporting leg period during which the foot portion 6 of the leg 3 lands on the floor, as shown in the upper diagram in FIG. 8. During the latter half of the supporting leg period, the desired knee bending angle decreases (the bending degree of the leg 3 at the knee joint 8 decreases) until the moment immediately before the end of the supporting leg period. Moreover, the desired knee bending angle increases from a moment immediately before the end of the supporting leg period through the first half of a free leg period (a period during which the foot portion 6 of the leg 3 is lifted off the floor). Thereafter, during the latter half of the free leg period, the desired knee bending angle decreases until the moment immediately before the end of the free leg period. Note that the desired knee bending angle slightly increases at the moment immediately before the end of the free leg period. Thus, maximum values of the desired knee bending angle in the running motion are observed at mid points of the supporting leg period and the free leg period. A minimum value of the same is observed immediately before the end of the supporting leg period.

Moreover, during the first half of the supporting leg period (generally, a period during which the desired knee bending angle increases), the required knee rotation force (the rotation forces in the bending direction and stretching directions of the leg 3 are expressed by a positive value and a negative value, respectively) greatly decreases from a positive rotation force to a negative rotation force (the rotation force greatly increases in the stretching direction of the leg 3). During the latter half of the supporting leg period (generally, a period during which the desired knee bending angle decreases) until the moment immediately before the end of the supporting leg period, the required knee bending angle increases up to a rotation force of approximate "0." From the moment immediately before the end of the supporting leg period through the first half of the free leg period, the required knee rotation force slowly decreases to a small negative value. Thereafter, during the latter half of the free leg period, the required knee rotation force slowly increases to a positive value from the negative value. Therefore, the required knee rotation force during the running motion increases in the stretching direction of the leg 3 particularly during the supporting leg period. In addition, the required knee rotation force in the stretching direction becomes maximum at about the mid point of the supporting leg period (this point generally corresponds to when the knee bending angle reaches a maximum value).

In this embodiment, in consideration of the aforementioned characteristics of the desired knee rotation angle and the required knee rotation force during the running motion of the robot 1, the auxiliary knee rotation force by the spring means 15 of the foregoing assist device 12 is acted on the knee joint 8 basically during a period within the supporting leg period of the leg 3, during which the required knee rotation force greatly increases in the stretching direction of the leg 3. In order to cause the auxiliary knee rotation force to act on the knee joint 8 as mentioned above, the lock period of the lock mechanism 24 is set in the abovementioned STEP 6-1 in the following manner or the like.

When the gait parameters currently set by the gait generator 31 are gait parameters corresponding to the running motion of the robot 1, the lock mechanism controller 33 first obtains the desired knee bending angle during the supporting leg period of the leg 3 (specifically, data of changes of the desired knee bending angle with time during the supporting leg period), based on the gait parameters. Then, at about the moment immediately before the end of the supporting leg period, the lock mechanism controller 33 finds time Toff (see the upper diagram of FIG. 8) at which the desired knee bending angle shows the minimum value $\theta$off and decides the time Toff as an stopping moment of the lock period. Further, the lock mechanism controller 33 finds time Ton at which the desired knee bending angle becomes the same value as the above-mentioned minimum value θoff at the beginning of the supporting leg period, and decides the time Ton as a starting moment of the lock period. Accordingly, a period from the above-mentioned time Ton to the time Toff (Ton to Toff) is set as the lock period as shown in the lower diagram in FIG. 8. Note that, as shown in the lower diagram in FIG. 8, a period other than the lock period (Ton to Toff) is the free period during which the lock mechanism 24 is in the free state. By setting the lock period (Ton to Toff) as above, the lock period is preferably set as a period during which the desired knee rotation force greatly changes in the stretching direction of the leg 3.

After setting the lock period in STEP 6-1 as above, the lock mechanism controller 33 next determines whether the current time is within the lock period (STEP 6-2). If the current time is within the lock period, the lock mechanism controller 33 transmits a lock command for directing the lock mechanism 24 to the locked state (specifically, a command for energizing the electromagnetic solenoid 26 so as to move the latch pin 25 of the lock mechanism 24 forward) to the lock mechanism 24 (STEP 6-3). On the other hand, when the current time is not within the lock period, the lock mechanism controller 33 transmits a free command for directing the lock mechanism 24 to the free state (specifically, a command for energizing the electromagnetic solenoid 26 so as to move the latch pin 25 of the lock mechanism 24 backward) to the lock mechanism 24 (STEP 6-4). Thus, the processing of STEP 6 is finished. Note that, when the robot 1 performs a normal walking motion, the lock mechanism 24 is in the free state for the entire period as mentioned earlier. Thus, the lock command is not transmitted to the lock mechanism 24. In this embodiment, during the running motion of the robot 1, the lock command is transmitted to the lock mechanism 24 in the lock period (Ton to Toff) set in the foregoing manner.

Figure 6:
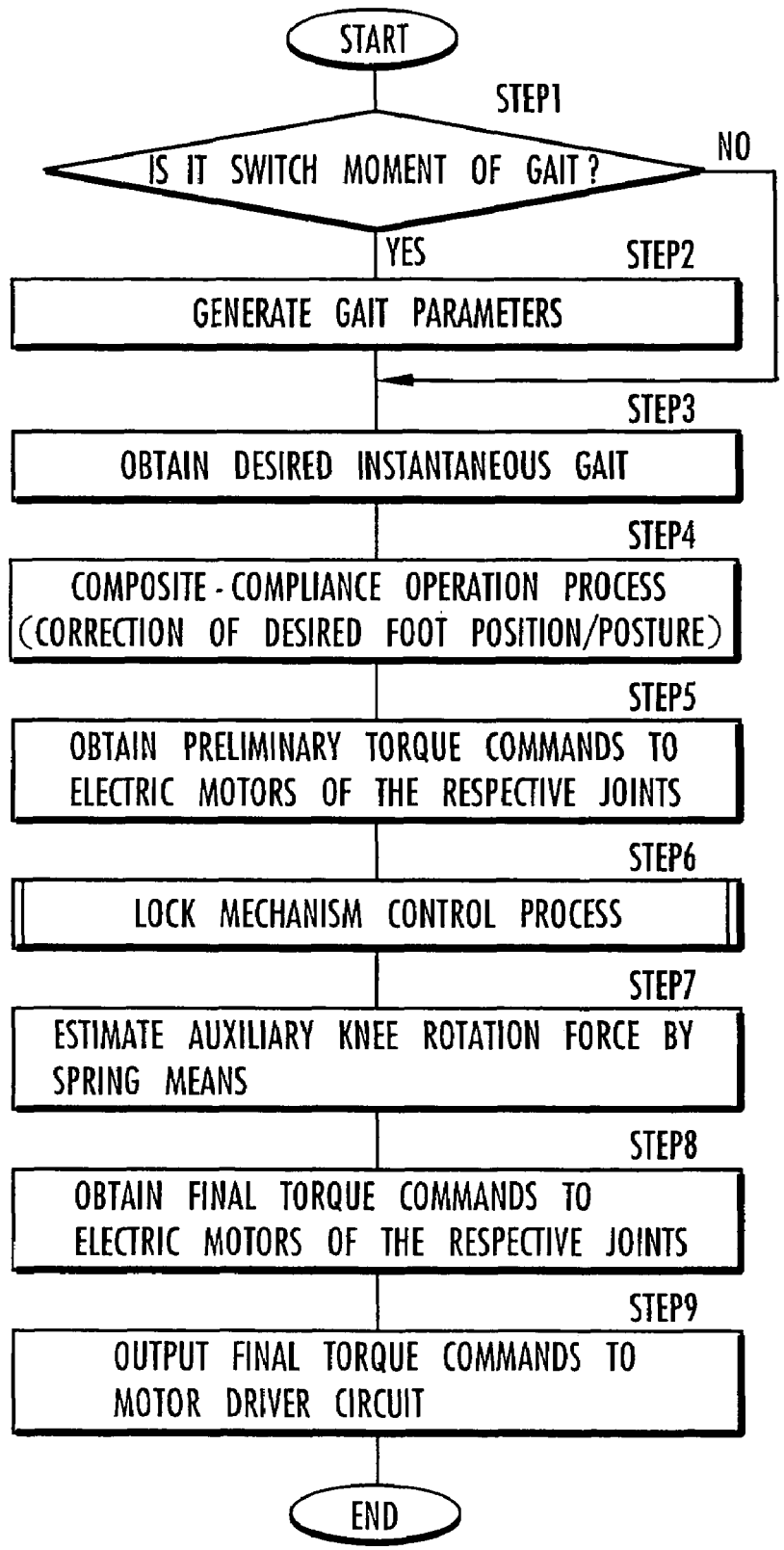
FIG. 6 is a flowchart showing processing by the control unit provided in the robot in FIG. 1.

Returning to the description of the flowchart in FIG. 6, after executing the lock mechanism control processing of STEP 6 as described above, the control unit 27 estimates the auxiliary knee rotation force (specifically, the auxiliary knee rotation force for each control cycle) by the spring means 15 of the assist device 12 (STEP 7). The estimated value of the auxiliary knee rotation force is used by the motor controller 32 to decide a final torque command to the knee joint electric motor 10. In this embodiment, the estimated value is obtained by the motor controller 32, for example, in the following manner. The motor controller 32 determines whether the lock mechanism 24 is in the locked state or the free state. When the switch moment exists, at which the free state is switched to the locked state, the motor controller 32 stores the current knee bending angle θ as the foregoing lock start knee bending angle. In this case, when, for example, the current time is in the lock period set by the foregoing lock mechanism controller 33, the motor controller 32 determines that the lock mechanism 24 is in the locked state. When the current time is not in the lock period, the motor controller 32 determines that the lock mechanism 24 is in the free state. Thereafter, at the start time of the lock period (start time of transmitting the aforementioned lock command), the motor controller 32 stores the knee bending angle θ, detected by the unillustrated encoder, as the foregoing lock start knee bending angle.

Note that, in this embodiment, the recesses 16a of the rod member 16 of the lock mechanism 24 are discretely provided. Thus, the locked state of the lock mechanism 24 does not always start simultaneously with the start time of the lock period set by the lock mechanism controller 33. The lock mechanism 24 is actually directed to the locked state when the latch pin 25 is fitted into the recess 16a that the latch pin 25 faces first, after the start of transmission of the lock command from the lock mechanism controller 33. Therefore, for example, in a case where a position of the latch pin 25 in motion is detected by an unillustrated sensor, it is preferred that the motor controller 32 determine that the lock mechanism 24 is in the locked state when the sensor detects the latch pin 25 is moving forward, in other words, the latch pin 25 being fitted into any one of the recesses 16a of the rod member 16. In addition, it is preferred that the motor controller 32 store the knee bending angle θ at the start time of the locked state thus determined, as the foregoing lock start knee bending angle.

The knee bending angle θ stored as the lock start knee bending angle may be, for example, data of the desired knee bending angle decided based on the gait parameters generated by the gait generator 31, or data of the knee bending angle decided based on the desired foot position/posture corrected in the foregoing composite-compliance operation processing.

Next, the motor controller 32 estimates the auxiliary knee rotation force by the spring means 15. In this case, in the present embodiment, data indicating the characteristics of the auxiliary knee rotation force by the spring means 15 as shown by the solid lines a and b in FIG. 4 is stored in an unillustrated memory in advance. When the lock mechanism 24 is in the locked state, the auxiliary knee rotation force by the spring means 15 is estimated based on the lock start knee bending angle stored as mentioned above, a detected value (or a desired value) of a current knee bending angle θ, and the aforementioned data indicating the characteristics of the auxiliary knee rotation force. For example, referring to FIG. 4, when the lock start knee bending angle is "θ2" and the current knee bending angle θ is θk, the estimated value of the auxiliary knee rotation force is "Mk." Note that, when the lock mechanism 24 is in the free state, the auxiliary knee rotation force is "0." Further, the auxiliary knee rotation force can also be detected directly by the use of a force sensor or the like.

After the auxiliary knee rotation force is estimated in STEP 7 as described above, the motor controller 32 of the control unit 27 decides final torque commands as ultimate torque commands to the electric motors of the respective joints 7, 8 and 9 of the leg 3 for each control cycle (STEP 8). In this case, the final torque command to the knee joint electric motor 10 decides an actual torque command to the knee joint electric motor 10 by subtracting the auxiliary knee rotation force obtained in the foregoing STEP 7 from the basic torque command (torque to be generated to the knee joint 8 corresponding to the desired gait, on an assumption that the auxiliary knee rotation force is "0") obtained by the equation (1) in the foregoing STEP 5. Specifically, the final torque command to the knee joint electric motor 10 is generated such that the sum of the final torque command to the knee joint electric motor 10 (a command value of torque to be actually generated to the knee joint electric motor 10) and the auxiliary knee rotation force becomes the basic torque command. Note that, for the final torque command for each of the electric motors of each of the joints 7 and 9 other than the knee joint 8, the basic torque command is used as it is.

Next, the control unit 27 outputs the final torque commands decided as above to the motor driver circuit 30 (STEP 9), thus ending the processing for each control cycle. In response to the output of the final torque commands, the electric motors of respective joints 7, 8 and 9 are energized and controlled so that the rotation angles of the electric motors, in other words, the rotation angles of the respective joints 7, 8 and 9 follow required rotation angles decided on the basis of the foregoing desired body position/posture and the desired foot position/posture (corrected in the foregoing composite-compliance operation processing). Hence, the robot 1 moves in accordance with the desired gait defined by the gait parameters.

In the system of this embodiment, the lock mechanism 24 is directed to the locked state and the auxiliary knee rotation force by the spring means 15 thus acts on the knee joint 8, only in a period during which the required knee rotation force becomes large in the stretching direction of the leg 3 (during a portion of the supporting leg period) while the robot 1 is in the running motion. In addition, the locked state starts when the knee bending angle θ is relatively small. Thus, as the knee bending angle θ increases after the start of the locked state, the auxiliary knee rotation force by the spring means 15 can be increased to a sufficient level for the required knee rotation force. Accordingly, torque to be generated to the knee joint electric motor 10 can be relatively small during the period during which the lock mechanism 24 is in the locked state (lock period). Thus, the current energizing the knee joint electric motor 10 may only be relatively small over the entire period of the running motion of the robot 1. Consequently, an energy loss can be small. In addition, in the lock period, in the state where the knee bending angle θ is increasing (a state of about the first half of the lock period in FIG. 8), the spring means 15 generates an elastic force (auxiliary knee rotation force) while storing elastic energy from kinetic energy of the robot 1. In the state where the knee bending angle θ is decreasing, the spring means 15 generates the elastic force (auxiliary knee rotation force) while releasing the stored elastic energy. In this case, generally, an energy loss is extremely small when switching between the elastic energy of the spring means 15 and the kinetic energy of the robot 1. Therefore, utilization efficiency of the energy in the system of this embodiment can be ensured in a favorable manner. Further, in the state where the required auxiliary knee rotation force is relatively small, the lock mechanism 24 is directed to the free state so that the elastic force by the spring means 15 is not generated. Thus, the torque to be generated to the knee joint electric motor 10 is surely maintained small, thus surely avoiding a situation causing an excessive burden on the knee joint electric motor 10.

Moreover, in this embodiment, the knee bending angles at start time and stop time of the locked state during the running motion of the robot 1 are equal, and thus the following effects can be obtained. Since the knee bending angles at the start time and the stop time of the locked state are equal to each other, the auxiliary knee rotation force by the spring means 15 is approximately "0" not only at the start time of the locked state but also at the stop time of the same. Therefore, a discontinuous change of the auxiliary knee rotation force by the spring means 15 can be avoided during a shift from the locked state to the free state. As a result, the behavior of the robot 1 will not be jerky during the shift from the locked state to the free state, and a smooth motion of the robot 1 can be realized. Further, there is the following effect particularly when the solid spring like the coiled spring 19 shown in FIG. 2(*a*) is used as the spring means 15. When the solid spring like the coiled spring 19 is used as the spring means 15, free vibration of the spring means 15 easily occurs from the stop time of the locked state (switch moment to the free state) if the knee bending angles at the start time and the stop time of the locked state are largely different from each other. When the free vibration occurs, it takes time to diminish the vibration. Thus, when re-starting the locked state, it is likely that a shift to the locked state is not performed smoothly. Yet, by setting the knee bending angles at the start time and the stop time of the locked state to be equal like this embodiment, it becomes possible to avoid the situation causing the free vibration of the spring means 15 at the stop time of the locked state, thereby preventing the aforementioned problems. To be more specific, the shift from the free state to the locked state is smoothly preformed, thus smoothly generating the auxiliary knee rotation force by the spring means 15.

Figure 9:
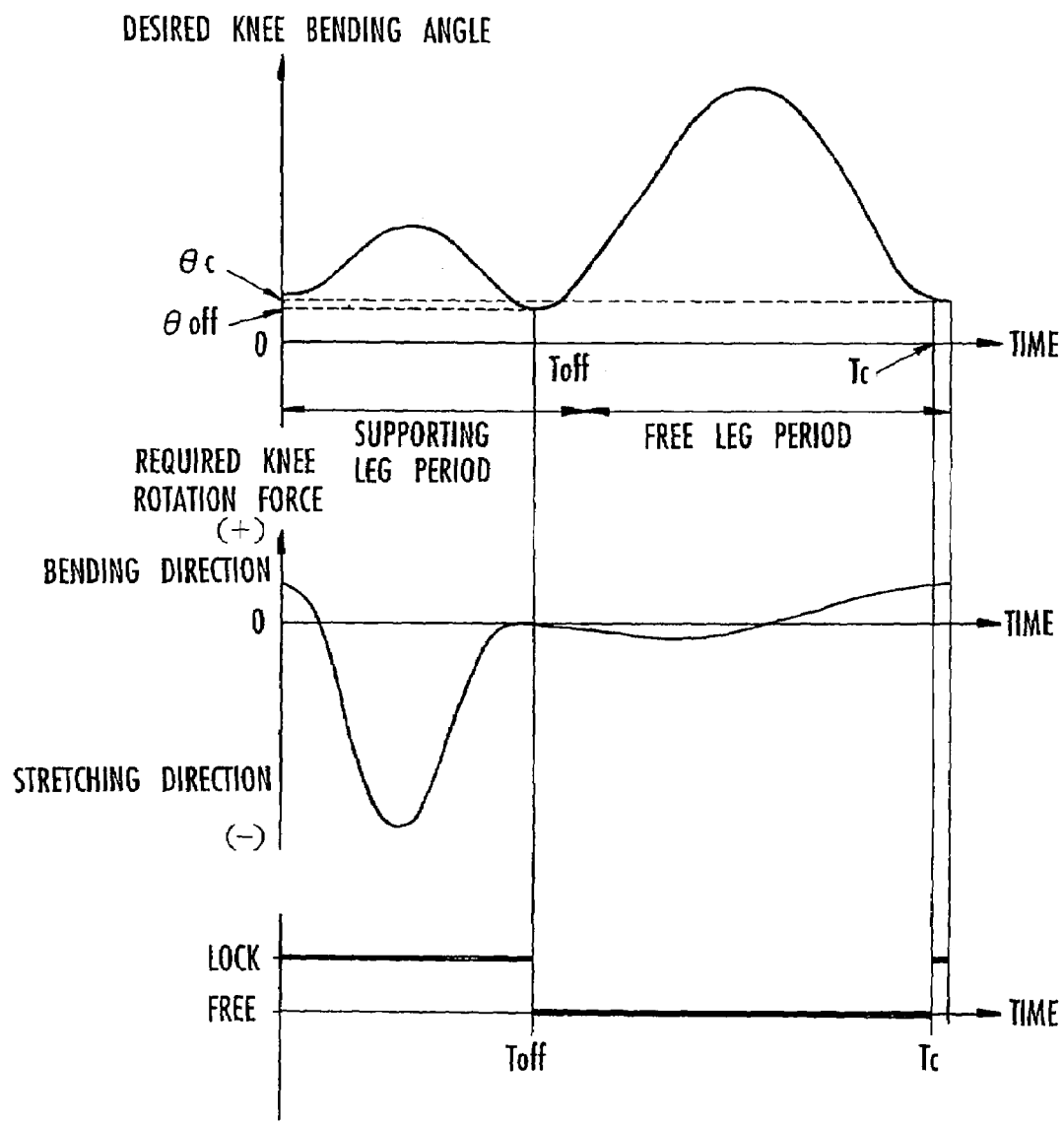
FIG. 9 is a diagram for explaining actuation of an assist device in a second embodiment of the present invention.

Next, a second embodiment of the present invention is described with reference to FIG. 9. Note that the present embodiment is different from the above-described first embodiment only in actuation of the robot 1 during a running motion thereof. Thus, the reference numerals and figures same as those for the first embodiment denote the same constituents and functional portions as those of the first embodiment, and detailed description thereof is omitted.

In the aforementioned first embodiment, description was provided regarding the case of causing the robot 1 to perform the normal running motion of a human (more specifically, the running motion with the body inclined forward). In this embodiment, for example, the robot 1 performs a running motion with similar footstep to those of a running human with the body thereof inclined slightly backward. Therefore, in this embodiment, the gait generator 31 of the control unit 27 generates gait parameters, which cause the robot 1 to perform the above-mentioned running motion, as appropriate based on a command from the outside or a movement plan of the robot 1, decided in advance.

In this case, in the above running motion, particularly, a desired knee bending angle defined by the gait parameters generated by the gait generator 31 of the control unit 27 is somewhat different from that of the foregoing first embodiment. Referring to FIG. 9, when causing the robot 1 to perform the similar running motion to that of the running human with the body inclined slightly backward, the desired knee bending angle changes as shown in an upper diagram in FIG. 9. In this case, the general tendency of the change of the desired knee bending angle is similar to that in the foregoing first embodiment (see FIG. 8). However, a minimum value θoff of the desired knee bending angle at the moment immediately before the end of the support leg period of the leg 3 is the lowest value of the desired knee bending angle. Specifically, the desired knee bending angle becomes larger than the minimum value θoff at time other than the time Toff at which the desired knee bending angle becomes the minimum value θoff. Note that the required knee rotation force corresponding to the desired knee bending angle shown in the upper diagram in FIG. 9 changes in the almost the same form as that in the first embodiment. However, the magnitude of the required knee rotation force (particularly the magnitude of the required knee rotation force during the supporting leg period) is different from that of the first embodiment.

Figure 7:
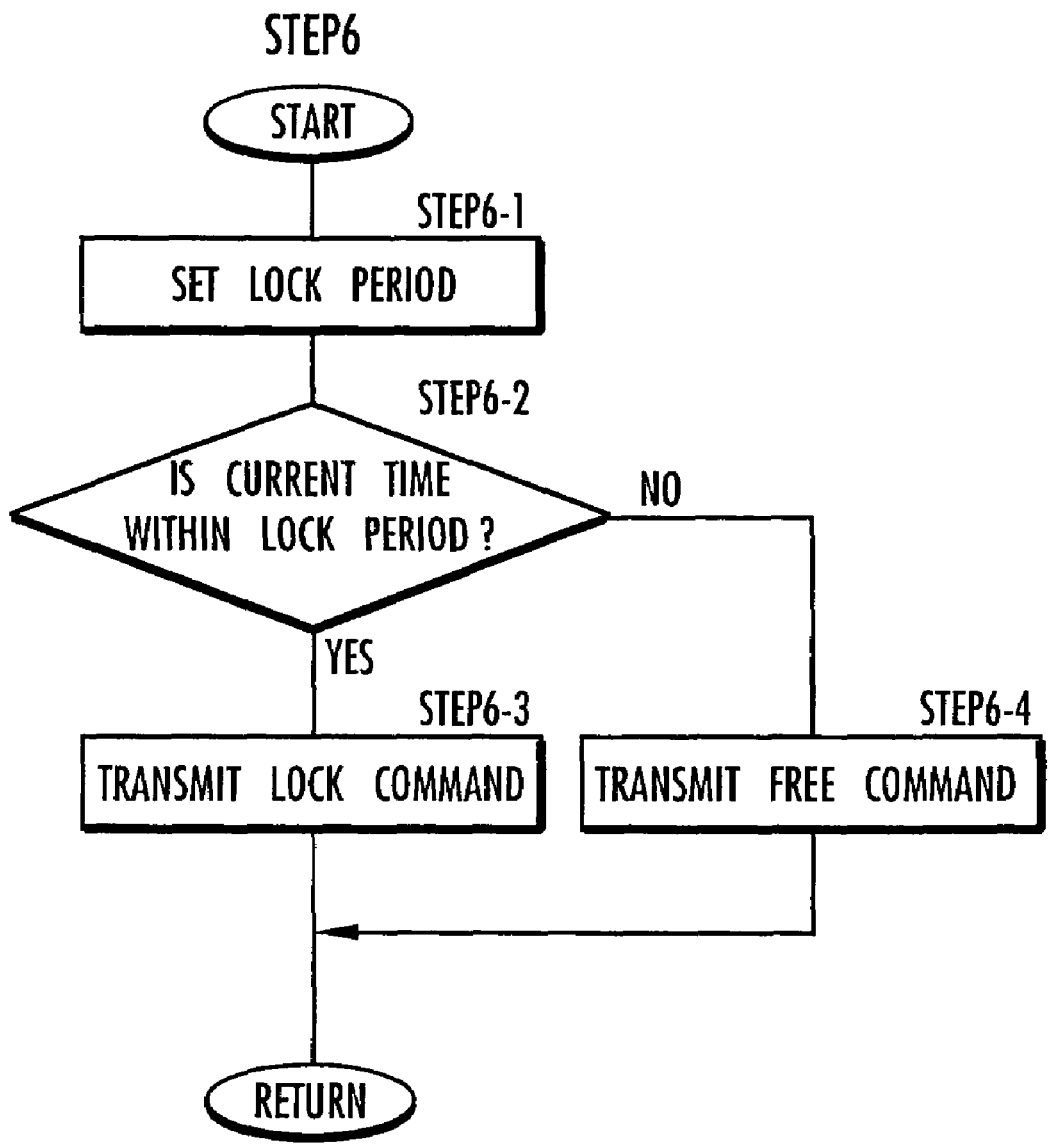
FIG. 7 is a flowchart showing subroutine processing of an essential part of the flowchart in FIG. 6.

In this embodiment, in consideration of the above-described characteristics of the desired knee bending angle and the required knee rotation force, the lock period during which the lock mechanism 24 is directed to the locked state is set in the following manner in the foregoing processing of STEP 6-1 in FIG. 7. When the gait parameters currently set by the gait generator 31 are gait parameters for causing the robot 1 to perform the running motion corresponding to that of the running human with the body inclined slightly backward, the lock mechanism controller 33 of the control unit 27 first obtains the desired knee bending angles in the supporting leg period and the free leg period (specifically, data of changes of the desired knee bending angles with time during the supporting leg period and the free leg period), based on the gait parameters. The lock mechanism controller 33 then decides the time Toff (see the upper diagram in FIG. 9), at which the desired knee bending angle becomes the minimum value θoff at about a moment immediately before the end of the supporting leg period, as the stopping moment of the lock period. This process of deciding the stopping moment of the lock period is the same as that of the first embodiment. Additionally, the lock mechanism controller 33 finds time Tc at which the desired knee bending angle becomes a minimum value θc at a moment immediately before the end of the free leg period (see the upper diagram in FIG. 9), and decides the time Tc as the start moment of the lock period. Thus, as shown in a lower diagram in FIG. 9, a period from the time Toff to the time Tc (Toff to Tc) is set as the free period, and a period other than the free period is set as the lock period. Accordingly, the lock period is set as a period during which the required knee rotation force is greatly changed in the stretching direction of the leg 3.

The actuation other than the above described actuation is the same as that in the foregoing first embodiment. In this embodiment, an effect similar to that of the first embodiment can be achieved. In this case, however, the knee bending angle θc at the start time of the locked state (a lock start knee bending angle) and the knee bending angle θoff at the stop time of the lock period are not the same. Nevertheless, the difference between these angles is relatively small. Therefore, there is no problem in practical use. In addition, by using a gas spring (for example, the spring with the configuration shown in FIG. 2(b)) as the spring means 15, free vibration of the spring means 15 at the stop time of the locked state can be avoided from being generated (generally, the free vibration hardly occurs in the gas spring).

Note that, in the first and second embodiments described so far, the lock period and the free period are set in the above mentioned manner. However, the manner for setting those periods is not limited to the above. For example, the starting or the stopping moment of the lock period may be set as a predetermined time before or after the foot landing time of the leg 3, or as a predetermined time before or after the foot of the leg 3 is lifted off the floor. Alternatively, the starting or stopping moment of the lock period may be set as a time point at which the knee bending angle or the rate of change (angular velocity) thereof reaches a predetermined value. In addition, the stopping moment of the lock period in particular may be a time point at which (the detected or desired value of) the knee bending angle θ becomes the knee bending angle at the start time of the lock period (lock start knee bending angle) or lower, after the start of the lock period. Alternatively, the stopping moment of the lock period may be a time point at which the absolute value of (the detected or estimated value of) the auxiliary knee rotation force by the spring means 15 becomes a predetermined value or lower (approximately "0"). Basically, it is preferred that the lock period be set as a period during which the knee bending angles at the start time and the stop time thereof are almost the same, and the required knee rotation force greatly increases in the stretching direction of the leg 3.

Moreover, in the first and second embodiments, the lock mechanism 24 is directed to the locked state by the fit between the latch pin 25 of the lock mechanism 24 and the recess 16a of the rod member 16. However, the lock mechanism 24 may be directed to the locked state by, for example, releasably cramping the rod member 16 by a frictional force. In this case, the lock mechanism can be directed to the locked state at an arbitrary knee bending angle. Further, in this case, free vibration of the spring means 15 may be suppressed by, for example, gradually decreasing the frictional force for cramping the rod member 16, at the stop moment of the locked state. Note that a technique of cramping the rod member 16 by the frictional force as above can be similarly applied to third and fourth embodiments described below.

Next, the third embodiment of the present invention is described with reference to FIGS. 10(a), 10(b) and 11. Note that this embodiment is different from the abovementioned first and second embodiments only in the configuration of the lock mechanism (motion transmission continuation/discontinuation means) of the assist device. Thus, the reference numerals and figures same as those for the first embodiment denote the same constituents and functional portions as those of the first embodiment, and description thereof is omitted.

Referring to FIG. 10(a), in the lock mechanism 34 of the assist device 12 of this embodiment, the upper portion of the rod member 16 connected to the spring means 15 (see FIG. 1) is inserted through a through hole 36 in a rod insertion member 35. In this case, the upper end of the through hole 36 is closed. A locking rod member 37 and a spring 38 are accommodated within the through hole 36 between the upper end of the through hole 36 and the upper end face of the rod member 16. The locking rod member 37 is movable in the axis direction of the rod member 16 (the axis direction of the through hole 36) and the spring 38 biases the locking rod member 37 downward so as to contact the locking rod member 37 against the upper end face of the rod member 16. A plurality of recesses 37a is provided on the side portion of the locking rod member 37 at intervals in the axis direction of the locking rod member 37. In addition, similarly to the lock mechanism 24 of the foregoing first and second embodiments, the latch pin 25 can be fitted into each of these recesses 37a. The latch pin 25 is moved forward and backward by energization control of the electromagnetic solenoid 26. Note that, similarly to the rod insertion member 17 of the foregoing first and second embodiments, the circumference portion of the rod insertion member 35 is connected to the thigh portion 4 of each of the legs 3 through the free joint 18 (see FIG. 1). The configurations other than the above-mentioned configuration are the same as those of the aforementioned first and second embodiments.

In the lock mechanism 34 having the above configuration, the free state thereof is a state where the latch pin 25 is moved backward and is not fitted into any of the recesses 37a as shown in FIG. 10(a). In this free state, the rod member 16 can be freely moved integrally with the locking rod member 37 in the knee bending and stretching motion of the leg 3. In this case, the biasing force of the above-mentioned spring 38 is sufficiently small and thus the spring means 15 is kept in the almost natural length state. Therefore, the auxiliary knee rotation force by the spring means 15 does not substantially act on the knee joint 8.

Further, the locked state of the lock mechanism 34 is a state where the latch pin 25 is fitted into one of the recesses 37a of the locking rod member 37 as shown in FIG. 10(b). In this locked state, once the knee bending angle becomes larger than the knee bending angle at the start time of the locked state (lock start knee bending angle) (a state of bending motion of the leg 3 at the knee joint 8), the spring means 15 stores elastic energy and generates an elastic force. This elastic force acts on the knee joint 8 in the stretching direction of the leg 8. On the other hand, when the knee bending angle becomes smaller than the above-mentioned lock start knee bending angle (a state of the stretching motion of the leg 3 at the knee joint 8), the rod member 16 is separated from the locking rod member 37 as shown in FIG. 10(*b*) and the spring means 15 is kept in the almost natural length state. Thus, the auxiliary knee rotation force by the spring means 15 stops acting on the knee joint 8.

Figure 11:
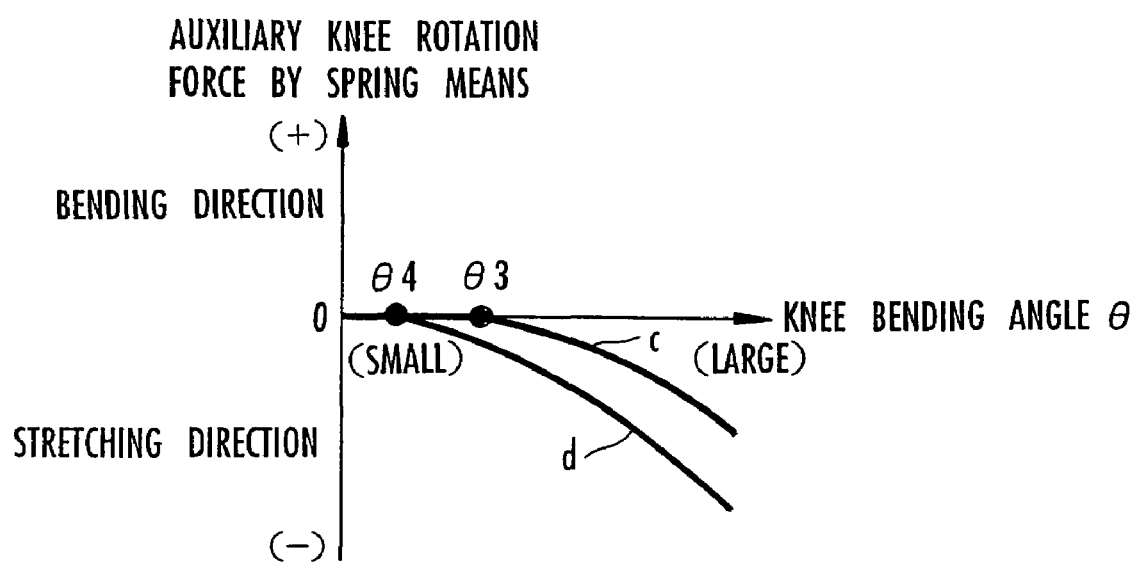
FIG. 11 is a diagram showing characteristics of spring means provided in the assist device in FIG. 10.

Therefore, when the lock mechanism 34 is directed to the locked state, the auxiliary knee rotation force generated by the spring means 15 exhibits the characteristics shown by, for example, a solid line c or d in FIG. 11, relative to the knee bending angle θ. Here, θ3 and θ4 in FIG. 11 denote the lock start knee bending angles. As described above, in the assist device 12 provided with the lock mechanism 34 of this embodiment, the auxiliary knee rotation force is not generated in the bending direction of the leg 3 at the knee joint 8. The auxiliary knee rotation force is generated in the stretching direction of the leg 3 only when the knee bending angle θ is larger than the lock start knee bending angles θ3 and θ4.

In the system of this embodiment provided with the above-mentioned lock mechanism 34, control processing is executed by the control unit 27 similarly to the foregoing first and second embodiments. In this case, even if, for example, the lock period is erroneously set by the lock mechanism controller 33 of the control unit 27 during the running motion of the robot 1, the auxiliary knee rotation force is not generated by the spring means 15 in the bending direction of the leg 3, in a state where the auxiliary knee rotation force by the spring means 15 is not required. Therefore, it is possible to avoid a situation where the burden on the knee joint electric motor 10 ends up being large. Moreover, even when the locked state of the lock mechanism 34 is started during the stretching motion of the leg 3 at the knee joint 8, the auxiliary knee rotation force by the spring means 15 is not generated during the stretching motion. Thus, it is possible to start the lock period while the knee bending angle θ is decreasing, for example, in the latter half of the free leg period of the leg 3.

Next, a fourth embodiment of the present invention is described with reference to FIGS. 12(*a*) and 12(*b*). Note that this embodiment is different from the foregoing first and second embodiments only in the configuration of the lock mechanism (motion transmission continuation/discontinuation means) of the assist device 12. Thus, the reference numerals and figures same as those for the first embodiment denote the same constituents and functional portions as those of the first embodiment, and description thereof is omitted.

Figure 12:
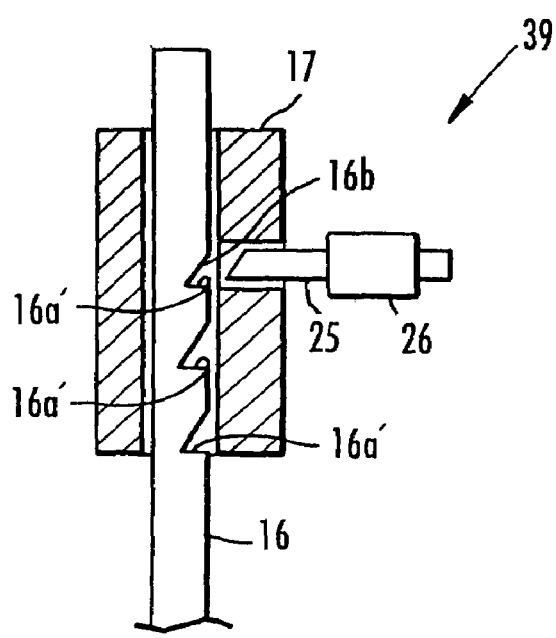
FIGS. 12(a) and 12(b) are cross sectional views showing a configuration of an essential part of an assist device in a fourth embodiment of the present invention.
Figure 12:
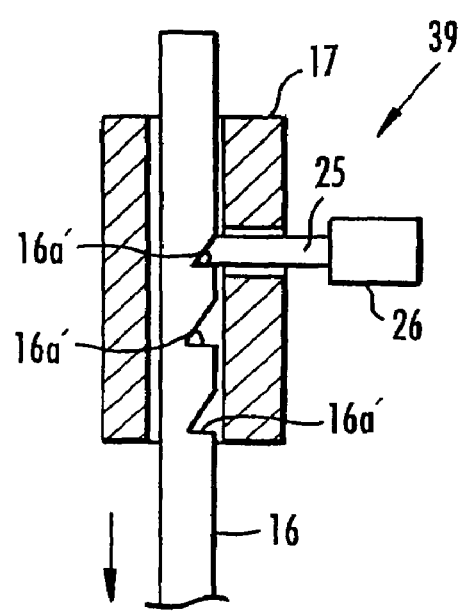

Referring to FIG. 12(*a*), in a lock mechanism 39 of the assist device 12 of this embodiment, a shape of each recess 16*a*' provided in the rod member 16 is different from that in the foregoing first and second embodiments. Specifically, in this embodiment, a tapered surface 16*b*, inclined from the upper end side of each of the recesses 16*a*' to the lower end side of the same, is formed in the bottom surface of each of the recesses 16*a*' in the rod member 16. This tapered surface 16*b* is formed so that the depth of each of the recesses 16*a*' gradually increases from the upper end side to the lower end side thereof. In addition, the end portion of the latch pin 25 is formed to have a similar shape to that of each of the above-mentioned recesses 16*a*' and can be fitted into each of the recesses 16*a*'. The configurations other than the above-mentioned configuration are absolutely the same as those of the foregoing first and second embodiments. Further, control processing by the control unit 27 is the same as that of the foregoing first and second embodiments.

In the system of this embodiment, in which the above lock mechanism 39 is provided in the assist device 12, the free state of the lock mechanism 39 is a state where the latch pin 25 is moved backward and withdrawn from the recess 16*a*' of the rod member 16 (a state of FIG. 12(*a*)). The actuation of the assist device 12 in the free state is absolutely the same as that of the first and second embodiments.

Further, as shown in FIG. 12(*b*), the locked state of the lock mechanism 39 is a state where the latch pin 25 is moved forward and fitted into one of the recesses 16*a*' of the rod member 16. In this locked state, the actuation of the assist device 12 is similar to that of the foregoing third embodiment. Specifically, when the knee bending angle becomes larger than the knee bending angle at the start time of the locked state (lock start knee bending angle), the spring means 15 stores elastic energy and generates an elastic force. This elastic force then acts on the knee joint 8 in the stretching direction of the leg 3. Moreover, when the knee bending angle becomes smaller than the lock start knee bending angle, the latch pin 25 is withdrawn from the recess 16*a*', since each of the recesses 16*a*' has the aforementioned tapered surface 16*b*. Thereafter, the rod member 16 moves as shown by an arrow in FIG. 12(*b*). Therefore, the spring means 15 is kept in the almost natural length state, and thus the auxiliary knee rotation force by the spring means 15 stops acting on the knee joint 8.

Accordingly, when the lock mechanism 39 is directed to the locked state, the auxiliary knee rotation force generated by the spring means 15 has the foregoing characteristics shown in FIG. 11, relative to the knee bending angle θ, similarly to the foregoing third embodiment. Specifically, in this embodiment, the auxiliary knee rotation force is not generated either in the bending direction of the leg 3 at the knee joint 8, similarly to the foregoing third embodiment. Thus, a similar effect to that of the foregoing third embodiment can be achieved.

Note that, in the assist device 12 of this embodiment, in a case where the lock period (more precisely, transmission of the lock command to the lock mechanism 39) is started while the knee bending angle θ is decreasing during, for example, the latter half of the free leg period of the leg 3 during the running motion of the robot 1, the substantial locked state of the lock mechanism 39 starts in a process where the knee bending angle θ increases from the moment immediately before the end of the free leg period of the leg 3 (same for the assist device 12 of the foregoing third embodiment). In this case, especially in the lock mechanism 39 of this embodiment, basically, the substantial locked state starts when the latch pin 25 of the lock mechanism 39 is fitted into the recess 16*a*' at the knee bending angle smaller than that at the time point at which transmission of the lock command is started (when the latch pin 25 is fitted into a lower recess 16*a* of the rod member 16). For example, referring to FIG. 11, if the lock command is transmitted when the knee bending angle θ is "θ3" during the stretching motion of the leg 3 in the latter half of the free leg period of the leg 3, the substantial locked state of the lock mechanism 39 starts later, for example, when the knee bending angle θ is "θ4" (θ4<θ3). In other words, the substantial locked state of the lock mechanism 39 can be started in a state where the knee bending angle θ becomes smallest possible value when the free leg period of the leg 3 shifts to the supporting leg period of the same. Thus, the auxiliary knee rotation force generated by the spring means 15 can be relatively large in the supporting leg period, thereby reducing the burden on the knee joint electric motor 10 more effectively.

Next, a fifth embodiment of the present invention is described with reference to FIG. 13. Note that this embodiment is different from the first and second embodiments only in the mechanical configuration of the assist device (especially, the mechanism of the motion transmission continuation/discontinuation means). Thus, the reference numerals and figures same as those for the first embodiment denote the same constituents and functional portions as those of the first embodiment, and description thereof is omitted.

Figure 13:
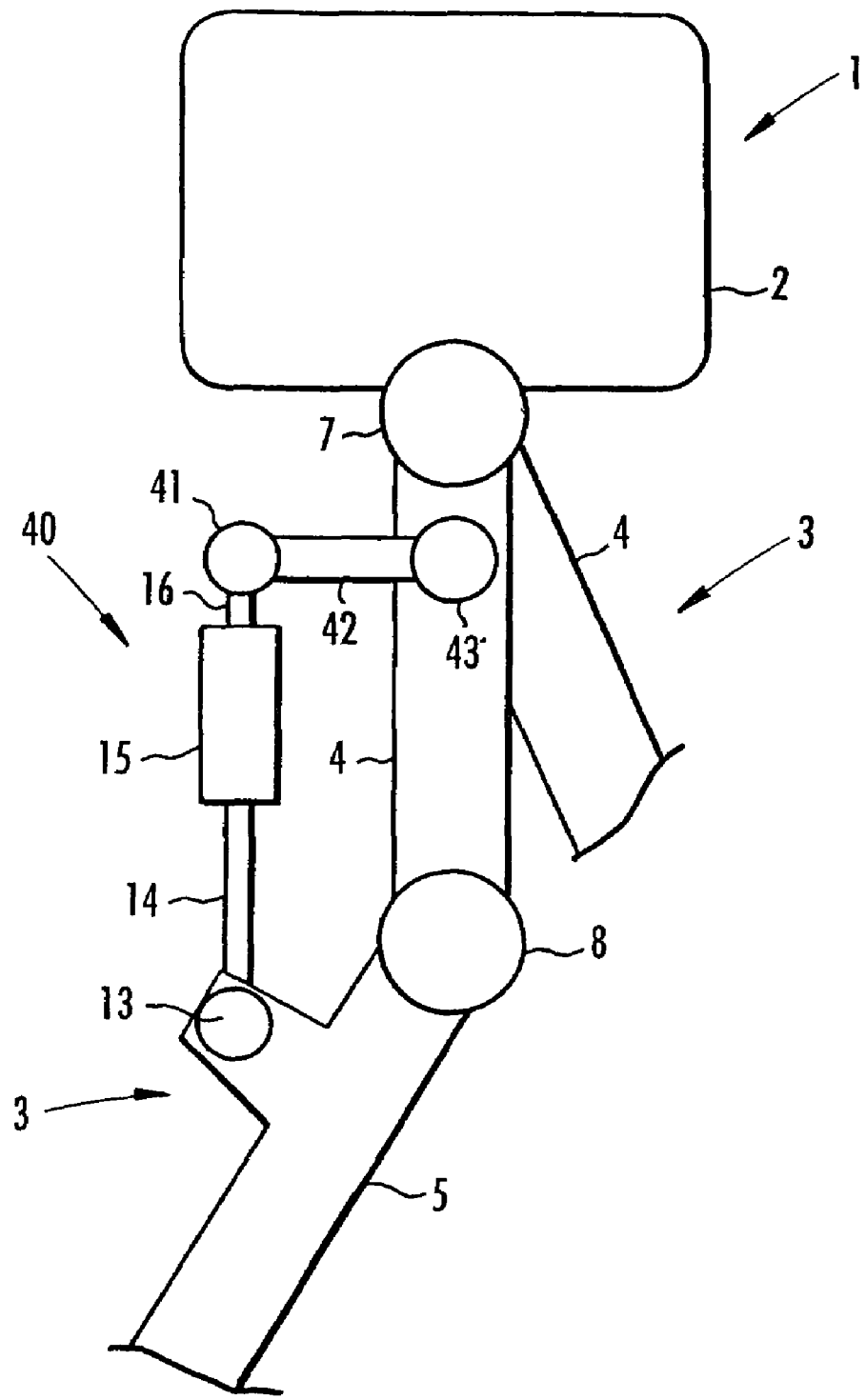
FIG. 13 is an explanatory view showing a configuration of an assist device in a fifth embodiment of the present invention.

Referring to FIG. 13, an assist device 40 of this embodiment is provided with the rod member 14 connected to the crus portion 5 of each of the legs 3 through the free joint 13, and the rod member 16 connected to the rod member 14 through the spring means 15, similarly to the assist device of the foregoing first and second embodiments. In addition, in this embodiment, one end potion of a connecting member 42 is connected to the upper end portion of the rod member 16 through a free joint 41. The other end of the connecting member 42 is releasably connected to the thigh portion 4 through a crutch mechanism 43 (which corresponds to the lock mechanism in the first and second embodiments) serving as the motion transmission continuation/discontinuation means. The clutch mechanism 43 fixes the connecting member 42 to the thigh portion 4 and releases the-fixed connecting mechanism 42. The clutch mechanism 43 is configured by, for example, an electromagnetic clutch. The configurations other than the above-described configuration are the same as those of the foregoing first and second embodiments. In addition, control processing by the control unit 27 is the same as that of the first and second embodiments. Note that, in this case, the clutch mechanism 43 fixes the connecting member 42 to the thigh portion 4 in accordance with the lock command transmitted from the lock mechanism controller 33 of the control unit 27, and the connecting member 42 fixed to the thigh portion 4 is released in accordance with the free command, in this embodiment.

In the assist device 40 of this embodiment, a state where the connecting member 42 is fixed to the thigh portion 4 by the clutch mechanism 43 corresponds to the foregoing locked state. In this locked state, the spring means 15 generates an elastic force (auxiliary knee rotation force) corresponding to the knee bending and stretching motion. Further, a state where the connecting member 42 fixed to the thigh portion 4 is released by the clutch mechanism 43 corresponds to the foregoing free state. In this free state, the knee bending and stretching motion is not transmitted to the spring means 15 and thus the spring means 15 does not generate the elastic force (auxiliary knee rotation force). Therefore, an effect of action similar to those of the foregoing first and second embodiments can be achieved.

Next, a sixth embodiment of the present invention is described with reference to FIGS. 14 and 15. Note that this embodiment is different from the foregoing first and second embodiments only in the mechanical configuration of the assist device (especially the mechanism of the motion transmission continuation/discontinuation means). Thus, the reference numerals and figures same as those for the first embodiment denote the same constituents and functional portions as those of the first embodiment, and description thereof is omitted.

Figure 14:
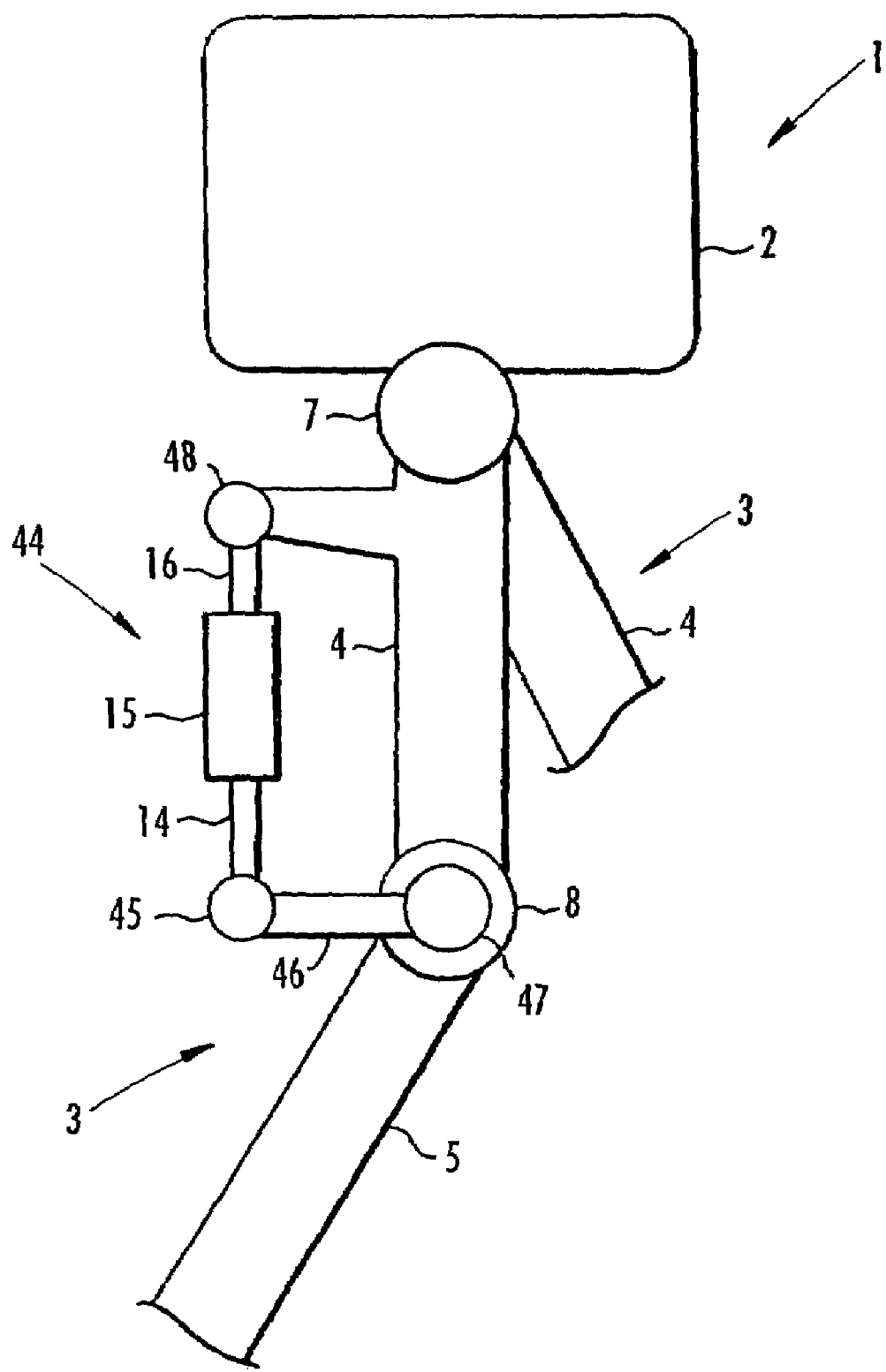
FIG. 14 is an explanatory view showing a configuration of an assist device in a sixth embodiment of the present invention.
Figure 15:
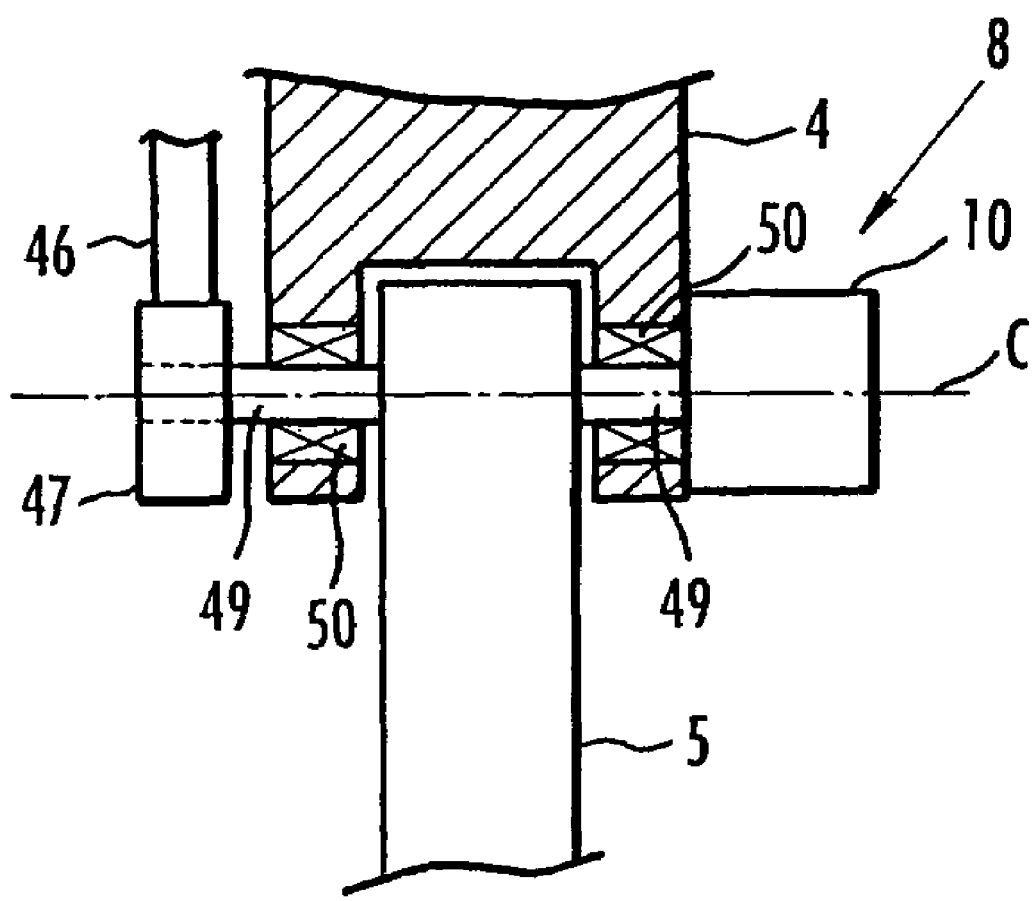
FIG. 15 is a cross sectional view showing a configuration of an essential part of the assist device in FIG. 14.

Referring to FIG. 14, an assist device 44 of this embodiment is provided with the rod members 14 and 16 connected to each other through the spring means 15, similarly to the assist devices of the first and second embodiments. In this case, the lower end portion of the rod member 14 on the lower side is connected to one end portion of a connecting member 46 through a free joint 45. The other end potion of the connecting member 46 is releasably connected to the crus portion 5 through a clutch mechanism 47 (the motion transmission continuation/discontinuation means) in the area of the knee joint 8 of each of the legs 3. Moreover, the upper end portion of the rod member 16 on the upper side is connected to the thigh portion 4 through a free joint 48.

Here, a connecting structure of the connecting member 46 and the crus portion 5 is more specifically described with reference to FIG. 15. The crus potion 5 is provided with a rotating shaft portion 49 along a rotation axis C of the knee joint 8. The rotating shaft portion 49 is rotatably supported by the thigh portion 4 through a bearing 50. The connecting member 46 is releasably connected to an end of the rotating shaft portion 49, projecting to the outside of the thigh portion 4, through the clutch mechanism 47 as illustrated. In this case, the clutch mechanism 47 fixes the connecting member 46 to the rotating shaft portion 49 of the crus portion 5 and releases the fixed connecting member 46 therefrom. The clutch mechanism 47 is configured by an electromagnetic clutch or the like. Note that the other end of the rotating shaft portion 49 is connected to the knee joint electric motor 10.

The configurations other than the above-described configuration are the same as those of the foregoing first and second embodiments. In addition, control processing by the control unit 27 is the same as that of the foregoing first and second embodiments. In this case, the clutch mechanism 47 fixes the connecting member 46 to the rotating shaft portion 49 of the crus portion 5 in accordance with the lock command transmitted from the lock mechanism controller 33 of the control unit 27, and the connecting member 46 fixed to the rotating shaft portion 49 is released in accordance with the free command, in this embodiment.

In the assist device 44 of this embodiment, a state where the connecting member 46 is fixed by the clutch mechanism 47 to the rotating shaft portion 49 of the crus portion 5 corresponds to the foregoing locked state. In this locked state, the spring means 15 generates an elastic force (auxiliary knee rotation force) corresponding to the knee bending and stretching motion. In addition, a state where the connecting member 46 fixed to the rotating shaft portion 49 is released by the clutch mechanism 47 (a state where the transmission of rotation from the rotating shaft portion 49 to the connecting member 46 is discontinued) corresponds to the foregoing free state. In this free state, the knee bending and stretching motion is not transmitted to the spring means 15, and thus the spring means 15 does not generate the elastic force (auxiliary knee rotation force). Therefore, an effect of action similar to those of the foregoing first and second embodiments can be achieved.

Note that, in the assist device 44 of this embodiment, the connecting member 46 is connected to the rotating shaft portion 49 of the crus portion 5 through the clutch mechanism 47 in the area of the knee joint 8. Therefore, in the free state of the clutch mechanism 47, a vertical movement or the like of the spring means 15 hardly occurs during the knee bending and stretching motion. Thus, particularly in the case where the spring means 15 is configured by a coiled spring or the like, it is possible to avoid a situation where free vibration of the spring means 15 is caused by an inertial force in the free state of the clutch mechanism 47. Accordingly, the auxiliary knee rotation force can be smoothly generated by the spring means 15 in a shift from the free state to the locked state.

Next, a seventh embodiment of the present invention is described with reference to FIGS. 16 and 17. Note that this embodiment is different from the foregoing first and second embodiments only in the mechanical configuration of the assist device (especially the mechanism of the motion transmission continuation/discontinuation means). Thus, reference numerals and figures the same as those for the first embodiment denote constituents and functional portions the same as those of the first embodiment, and a description thereof is omitted.

Figure 16:
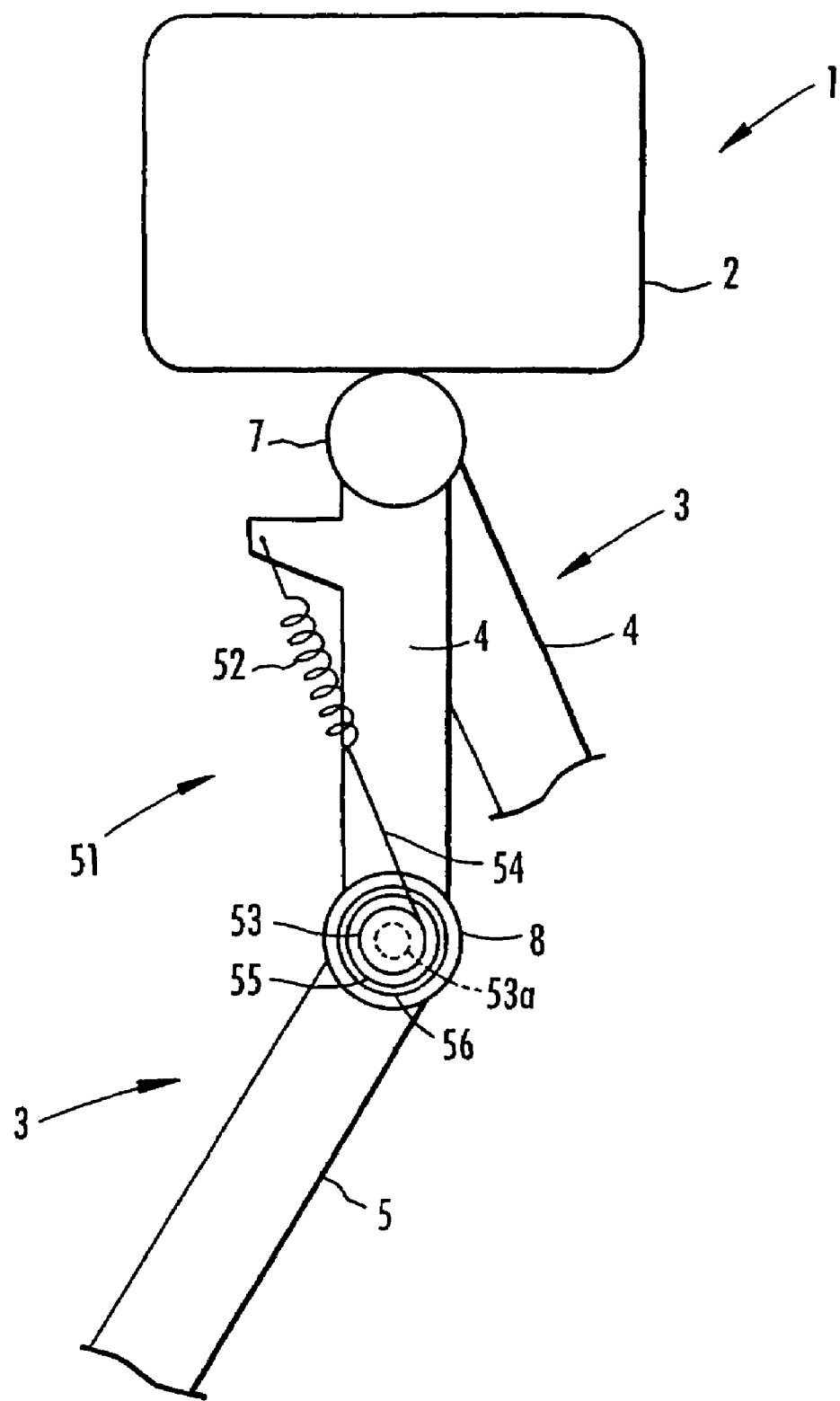
FIG. 16 is an explanatory view showing a configuration of an assist device in a seventh embodiment of the present invention.
Figure 17:
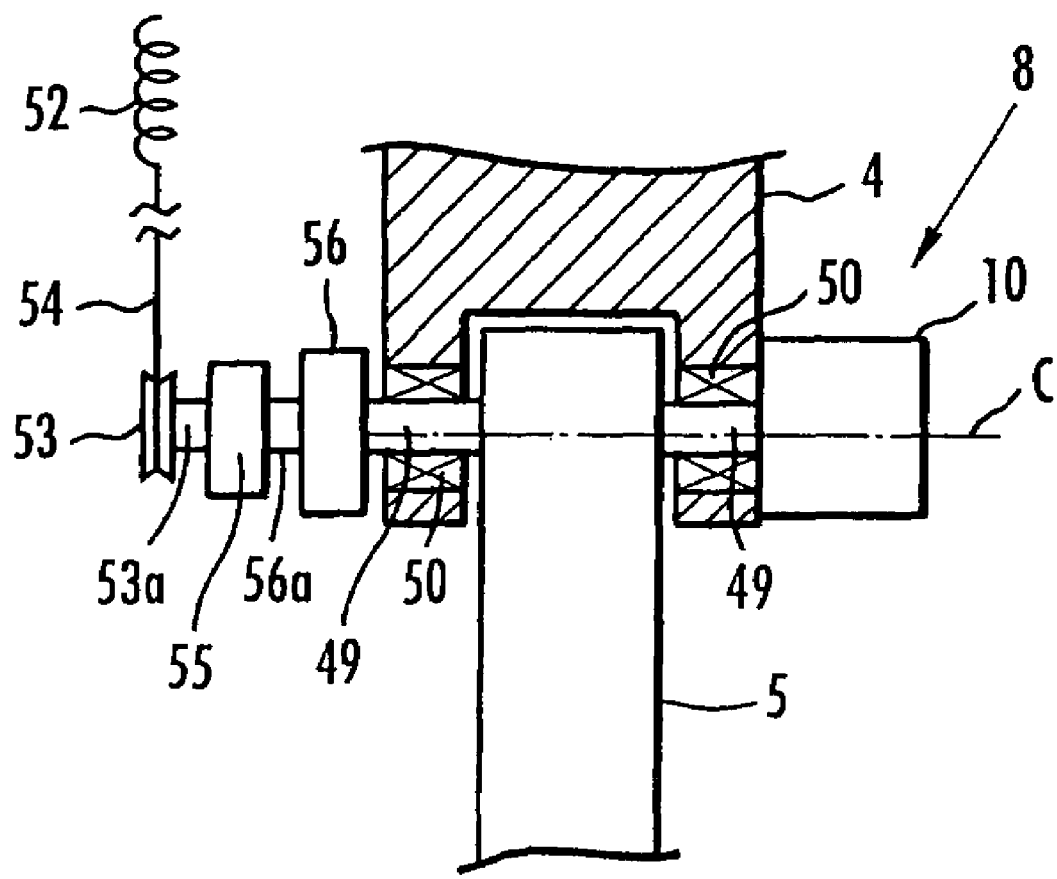
FIG. 17 is a cross sectional view showing a configuration of an essential part of the assist device in FIG. 16.

Referring to FIG. 16, an assist device 51 of this embodiment is provided with, for example, a coiled spring 52 serving as the spring means 15. In this case, one end of the coiled spring 52 is joined with the thigh portion 4. The other end is joined with the circumferential portion of a pulley 53 through a wire 54. The pulley 53 is rotatably provided to be concentric with the rotation axis of the knee joint 8. In addition, a rotating shaft portion 53a of the pulley 53 is connected to the crus portion 5 through a clutch mechanism 55 (the motion transmission continuation/discontinuation means) and a speed reducer 56.

Here, the connecting structure of the pulley 53 and the crus portion 5 is more specifically described with reference to FIG. 17. Similar to the case of the aforementioned sixth embodiment, the rotating shaft portion 49 of the crus portion 5 is rotatably supported by the thigh portion 4 through the bearing 50. One end portion of the rotating shaft portion 49, projecting to the outside of the thigh portion 4, is connected to the output side of the speed reducer 56. The input shaft 56a of the speed reducer 56 is releasably connected to the rotating shaft portion 53a of the pulley 53 through the clutch mechanism 55. In this case, the clutch mechanism 55 fixes the rotating shaft portion 53a of the pulley 53 to the input shaft 56a of the speed reducer 56 and releases the fixed rotating shaft portion 53a. The clutch mechanism 55 is configured by an electromagnetic clutch or the like. During the knee bending and stretching motion, the speed reducer 56 increases the rotation speed of the input shaft 56a thereof so that the rotation speed thereof becomes faster than the rotation speed of the rotation shaft portion 49 of the crus portion 5. Note that, instead of providing the speed reducer 56 as above, the rotation of the electric motor 10 may be transmitted to the crus portion 5 after the speed of the rotation is reduced by a speed reducer, and then transmitted to the pulley 53 as it is through the clutch mechanism 55.

The configurations other than the above-described configuration are the same as those of the foregoing first and second embodiments. In addition, control processing by the control unit 27 is the same as that of the first and second embodiments. In this case, in this embodiment, the clutch mechanism 55 fixes the rotating shaft portion 53a of the pulley 53 to the input shaft 56a of the speed reducer 56 in accordance with the lock command transmitted from the lock mechanism controller 33 of the control unit 27. The fixed rotating shaft portion 53a is released in accordance with the free command.

In the assist device 51 of this embodiment, a state where the clutch mechanism 55 fixes the rotating shaft portion 53a of the pulley 53 to the input shaft 56a of the speed reducer 56, corresponds to the foregoing locked state. In this locked state, the coiled spring 52 expands and contracts in accordance with the knee bending and stretching motion and generates an elastic force (auxiliary knee rotation force). Further, a state where the rotating shaft portion 53a of the pulley 53 fixed to the input shaft 56a of the speed reducer 56 is released by the clutch mechanism 55 (a state where transmission of the rotation from the input shaft 56a of the speed reducer 56 to the pulley 53 is discontinued) corresponds to the foregoing free state. In this free state, the knee bending and stretching motion is not transmitted to the coiled spring 52, and thus the coiled spring 52 does not generate the elastic force (auxiliary knee rotation force). Accordingly, an effect of action similar to those of the foregoing first and second embodiments can be achieved.

In this case, in the assist device 51 of this embodiment, the expansion and contraction of the coiled spring 52 with respect to changes in the knee bending angle θ is relatively large in the locked state of the clutch mechanism 55. Therefore, a relatively large auxiliary knee rotation force can be generated by the coiled spring 52 when the clutch mechanism 55 is in the locked state, thereby reducing the burden on the knee joint electric motor 10. Thus, the assist device 51 having the configuration of this embodiment is advantageous when employing the above-mentioned coiled spring 52 or the like with relatively large expansion and contraction, as the spring means.

Next, an eighth embodiment of the present invention is described with reference to FIGS. 18 and 19. Note that this embodiment is different from the foregoing first and second embodiments only in the mechanical configuration of the assist device. Thus, reference numerals and figures the same as those for the first embodiment denote constituents and functional portions the same as those of the first embodiment, and a description thereof is omitted.

Figure 18:
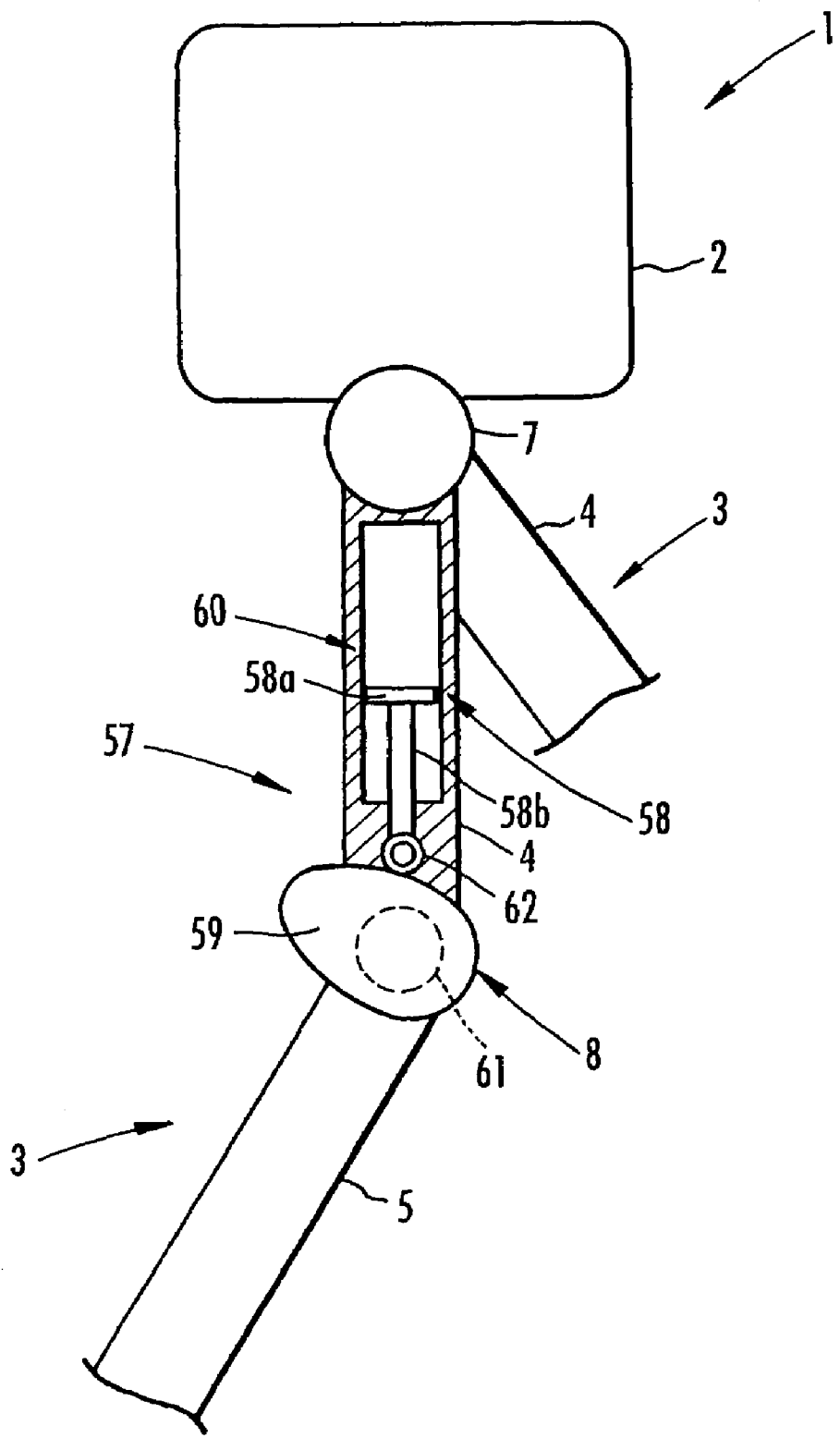
FIG. 18 is an explanatory view showing a configuration of an assist device in an eighth embodiment of the present invention.

Referring to FIG. 18, an assist device 57 of this embodiment is provided with a cylinder 58 formed within the thigh portion 4 of each of the legs 3, and a cam 59 provided at the knee joint 8 of each of the legs 3. A piston 58a, slidable in the axis direction of the cylinder 58, is accommodated in the cylinder 58 within the thigh portion 4. Gas such as air is sealed above and below the piston 58a. Thus, spring means 60 (gas spring) is configured within the cylinder 58.

Figure 19:
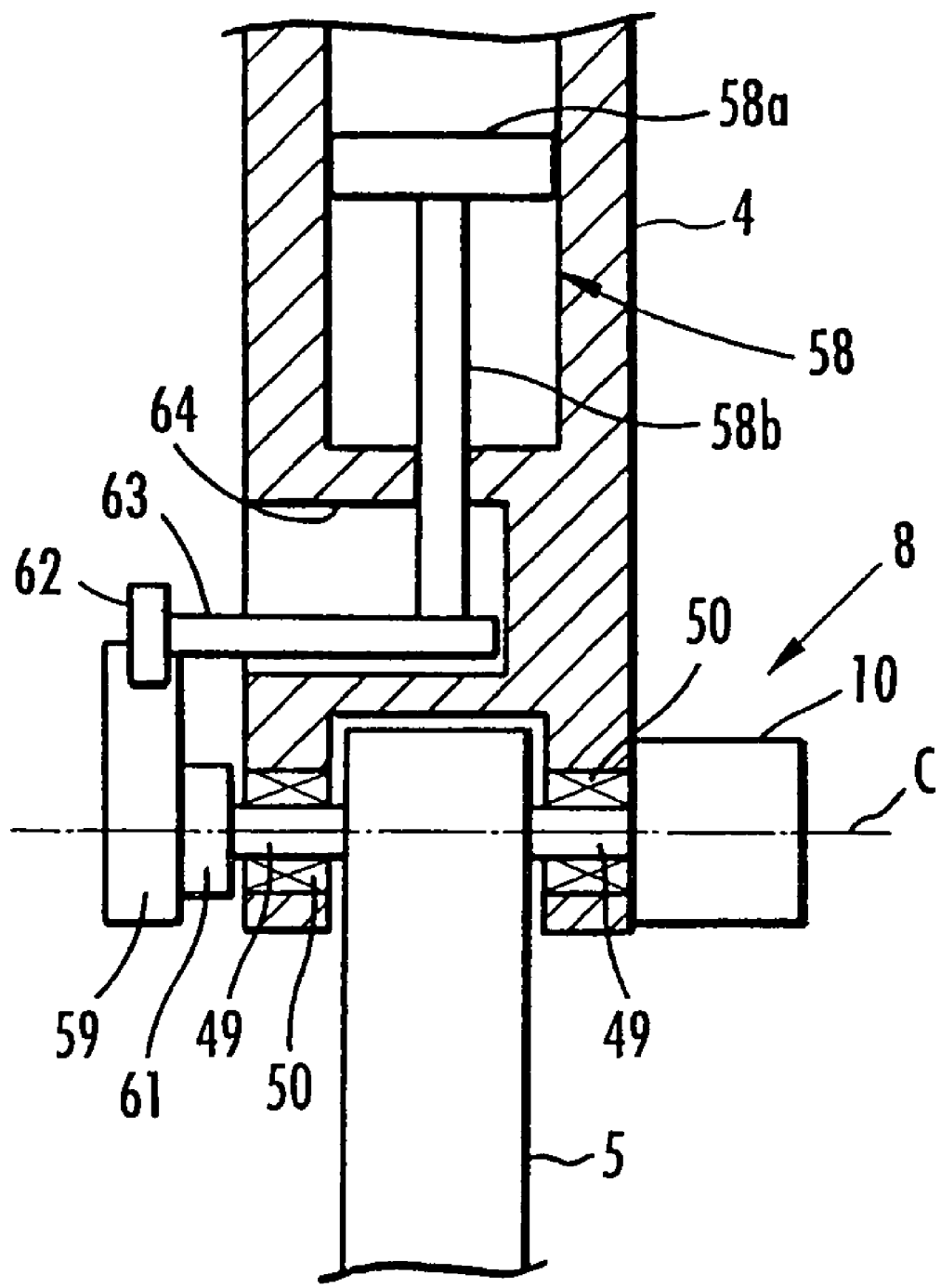
FIG. 19 is a cross sectional view showing a configuration of an essential part of the assist device in FIG. 18.

The cam 59 is for moving the above-mentioned piston 58a, and is connected to the crus portion 5 through a clutch mechanism 61 as shown in FIG. 19. Specifically, the rotating shaft portion 49 of the crus portion 5 is rotatably supported by the thigh portion 4 through the bearing 50, similarly to the case of the foregoing sixth embodiment. In addition, one end of the rotating shaft portion 49, projecting to the outside of the thigh portion 4, is releasably connected to the cam 59 through the clutch mechanism 61. The clutch mechanism 61 fixes the cam 59 to the rotating shaft portion 49 of the crus portion 5 and releases the fixed cam 59. The clutch mechanism 61 is configured by an electromagnetic clutch or the like.

Moreover, a roller 62 is in contact with the circumferential surface (cam surface) of the cam 59. A rod 63 rotatably supporting the roller 62 is inserted into an insertion hole 64 of the thigh portion 4 in a direction of crossing the thigh portion 4 from the side surface thereof. In this case, the insertion hole 64 of the thigh portion 4 is formed to have a kerf shape, extending in the movable direction of the aforementioned piston 58a (the axis direction of the cylinder 58). As the cam 59 rotates (as the rotating shaft portion 49 of the crus portion 5 rotates about the axis C), the rod 63 is guided into the insertion hole 64 and, at the same time, moves together with the roller 62 in the axis direction of the cylinder 58. The end portion of the aforementioned rod 63 in the insertion hole 64 is connected to a piston rod 58b extending downward from the piston 58a in the axis direction of the cylinder 58.

In the assist device 57 of this embodiment, a state where the clutch mechanism 61 fixes the cam 59 to the rotating shaft portion 49 of the crus portion 5, corresponds to the foregoing locked state. In this locked state, the cam 59 rotates about the axis of the rotating shaft portion 49 of the crus portion 5 in accordance with the knee bending and stretching motion, and thereby the piston 58a moves in the axis direction of the cylinder 58 through the roller 62, the rod 63 and the piston rod 58b. Thus, an elastic force of the spring means 60, which is the gas spring, is generated, and acts on the knee joint 8 as the auxiliary knee rotation force. Further, a state where the cam 59 fixed to the rotating shaft portion 49 is released by the clutch mechanism 61, corresponds to the foregoing free state. In this free state, since the cam 59 does not rotate, the piston 58a does not move. Specifically, the knee bending and stretching motion is not transmitted to the spring means 60, and the spring means 60 does not generate the elastic force (auxiliary knee rotation force). Therefore, an effect of action similar to those of the foregoing first and second embodiments can be achieved. Note that, in the assist device 57 having the configuration of this embodiment, it becomes relatively easy to provide the spring means 60 within the thigh portion 4, thus the entire structure of the robot 1 can be miniaturized. Alternatively, a linear motion to rotary motion transformer such as a crankshaft may be used instead of the cam 59.

Note that, in the fifth to eighth embodiments, when the knee bending angle θ becomes smaller than the lock start knee bending angle, the spring means can be maintained in the natural length state similarly to the case of the third or the fourth embodiment by using, for example, the one-way clutch mechanism as each of the clutch mechanisms 43, 47, 55 and 61.

Next, a ninth embodiment of the present invention is described with reference to FIG. 20. Note that this embodiment is different from the foregoing first and second embodiments only in the mechanical configuration of the assist device. Thus, reference numerals and figures the same as those for the first embodiment denote constituents and functional portions the same as those of the first embodiment, and a description thereof is omitted.

Figure 20:
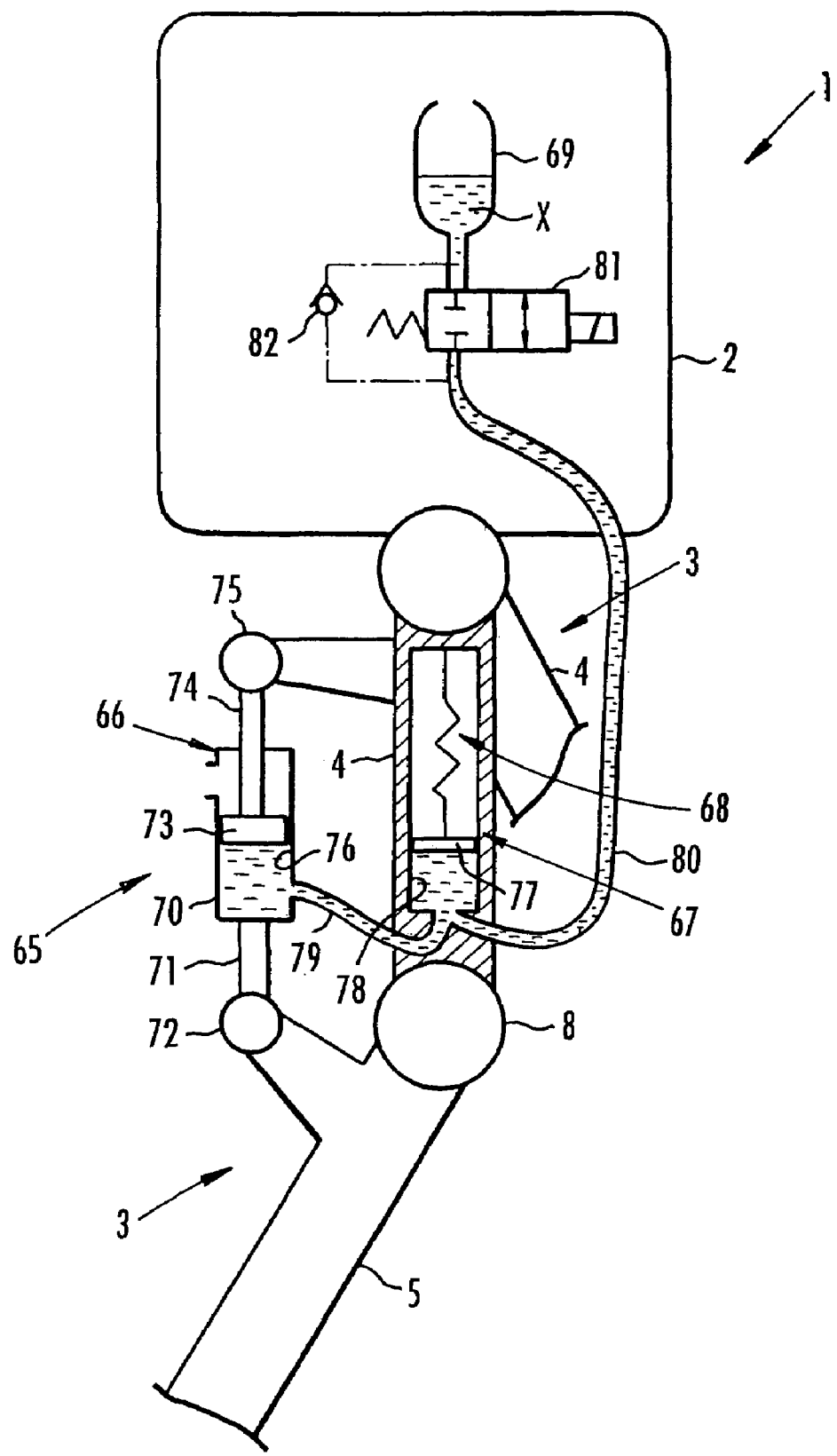
FIG. 20 is an explanatory view showing a configuration of an assist device in a ninth embodiment of the present invention.

Referring to FIG. 20, an assist device 65 of this embodiment includes a cylinder 66 provided by being connected to the thigh portion 4 and the crus portion 5 outside of each of the legs 3, a cylinder 67 formed within the thigh portion 4, spring means 68 accommodated within the cylinder 67, and a reserve tank 69 storing hydraulic oil X. A connecting member 71 is fixed to the bottom part of an outer cylinder 70 of the cylinder 66 outside of the leg 3. The connecting member 71 is connected to the crus portion 5 through a free joint 72. Further, a piston rod 74 extends from a piston 73 toward the upper side of the outer cylinder 70. The piston 73 is slidable within the outer cylinder 70 of the cylinder 66 in the axis direction of the outer cylinder 70. The end potion (upper end portion) of the piston rod 74 is connected to the thigh portion 4 through a free joint 75. A space 76 formed under the piston 73 within the outer cylinder 70 is an oil chamber 76 filled with the hydraulic oil X. Note that a space above the piston 73 within the outer cylinder 70 is opened to, for example, the atmosphere.

A piston 77, slidable in the longitudinal direction of the thigh portion 4 (a vertical direction in the figure), is provided within the cylinder 67 of the thigh portion 4. The spring means 68 is placed between this piston 77 and the upper end portion of the inner wall of the cylinder 67. The spring means 68 is, for example, a solid spring such as a coiled spring. A space 78 under the piston 77 within the cylinder 67 is an oil chamber 78 filled with the hydraulic oil X. In this case, the oil chamber 78 within the cylinder 67 communicates with the oil chamber 76 of the cylinder 66 outside the leg 3 through a communicating pipe 79, and is also connected to the reserve tank 69 through a communicating pipe 80 and a switch valve 81. Here, the switch valve 81 is an electromagnetic switch valve which can switch between a close state and an open state. In the close state, the reserve tank 69 and the oil chamber 78 of the cylinder 67 are blocked. In the open state, the reserve tank 69 and the oil chamber 78 are opened. The switch valve 81 corresponds to the motion transmission continuation/discontinuation means in the present invention. Note that the reserve tank 69 and the switch valve 81 are accommodated in the body 2 of the robot 1. Further, a check valve 82 shown by an imaginary line in FIG. 20 is related to a modified aspect of this embodiment, which will be described later.

In the assist device 65 having the above configuration, a state where the switch valve 81 is actuated to the open state and a state where the switch valve is actuated to the close state, correspond to the free state and the locked state in the foregoing first and second embodiments, respectively. Specifically, in the state where the switch valve 81 is actuated to the open state, the hydraulic oil X is sent and received between the oil chamber 76 and the reserve tank 69 through the oil chamber 78 of the cylinder 67 within the thigh portion 4, in accordance with changes in the volume of the oil chamber 76 of the cylinder 66 accompanying the knee bending and stretching motion of the leg 3. At this time, the pressure of the hydraulic oil X is steadily and constantly maintained, without causing a change in the volume of the oil chamber 78 of the cylinder 67. Therefore, the spring means 68 within the cylinder 67 is maintained in the natural length state and thus does not generate elastic force. Thus, the elastic force by the spring means 68 does not act on the knee joint 8. Accordingly, the open state of the switch valve 81 corresponds to the free state.

On the other hand, in the state where the switch valve 81 is actuated to the close state, the hydraulic oil X is sent and received between the oil chamber 76 and the oil chamber 78 of the cylinder 67, in accordance with changes in the volume of the oil chamber 76 of the cylinder 66 accompanying the knee bending and stretching motion of the leg 3. Thus, the piston 77 within the cylinder 67 slides and thus the elastic force of the spring means 68 is generated. Specifically, the knee bending and stretching motion of the leg 3 is transmitted to the spring means 68 through the cylinder 66 and the hydraulic oil X, and the elastic force of the spring means 68 is generated. Thereafter, the elastic force causes pressure changes in the hydraulic oil X and acts on the knee joint 8 of the leg 3 as the auxiliary knee rotation force, through the hydraulic oil X and the cylinder 66. Accordingly, the close state of the switch valve 81 corresponds to the locked state.

Configurations other than the above-described configuration are the same as those of the foregoing first and second embodiments. In addition, control processing by the control unit 27 is the same as that of the foregoing first and second embodiments. However, in this case, the lock command transmitted from the lock mechanism controller 33 of the control unit 27 is a command to cause the switch valve 81 to be in the close state, and the free command is a command to cause the switch valve 81 to be in the open state. Therefore, the system of this embodiment can achieve an effect of action similar to those of the foregoing first and second embodiments. Note that the spring means 68 within the cylinder 67 may be a gas spring instead of a solid spring such as a coiled spring. In this case, gas such as air may be sealed in the space above the piston 77. In this case, the piston 77 may be omitted so that the gas serving as the spring means is directly in contact with the hydraulic oil X within the cylinder 67. Alternatively, similar to a general accumulator for hydraulic equipment, the gas may be sealed in a rubber bag and the bag is allowed to be in contact with the hydraulic oil X.

Moreover, in this embodiment, as shown by the imaginary line in FIG. 20, the check valve 82 may be connected in parallel to the switch valve 81. In the case where the check valve 82 is provided as above, when the knee bending angle θ becomes smaller than the knee bending angle at the start time of the locked state (lock start knee bending angle) in the locked state in which the switch valve 81 is directed to the close state, the hydraulic oil X flows from the reserve tank 69 to the oil chamber 76 of the cylinder 66 similarly to the case of the free state. Therefore, the elastic force of the spring means 68 is not generated. Accordingly, an effect of action similar to those in the cases of the foregoing third and fourth embodiments can be achieved.

Next, a tenth embodiment of the present invention is described with reference to FIG. 21. Note that this embodiment is different from the foregoing first and second embodiments only in the mechanical configuration of the assist device. Thus, reference numerals and figures the same as those for the first embodiment denote constituents and functional portions the same as those of the first embodiment, and a description thereof is omitted.

Figure 21:
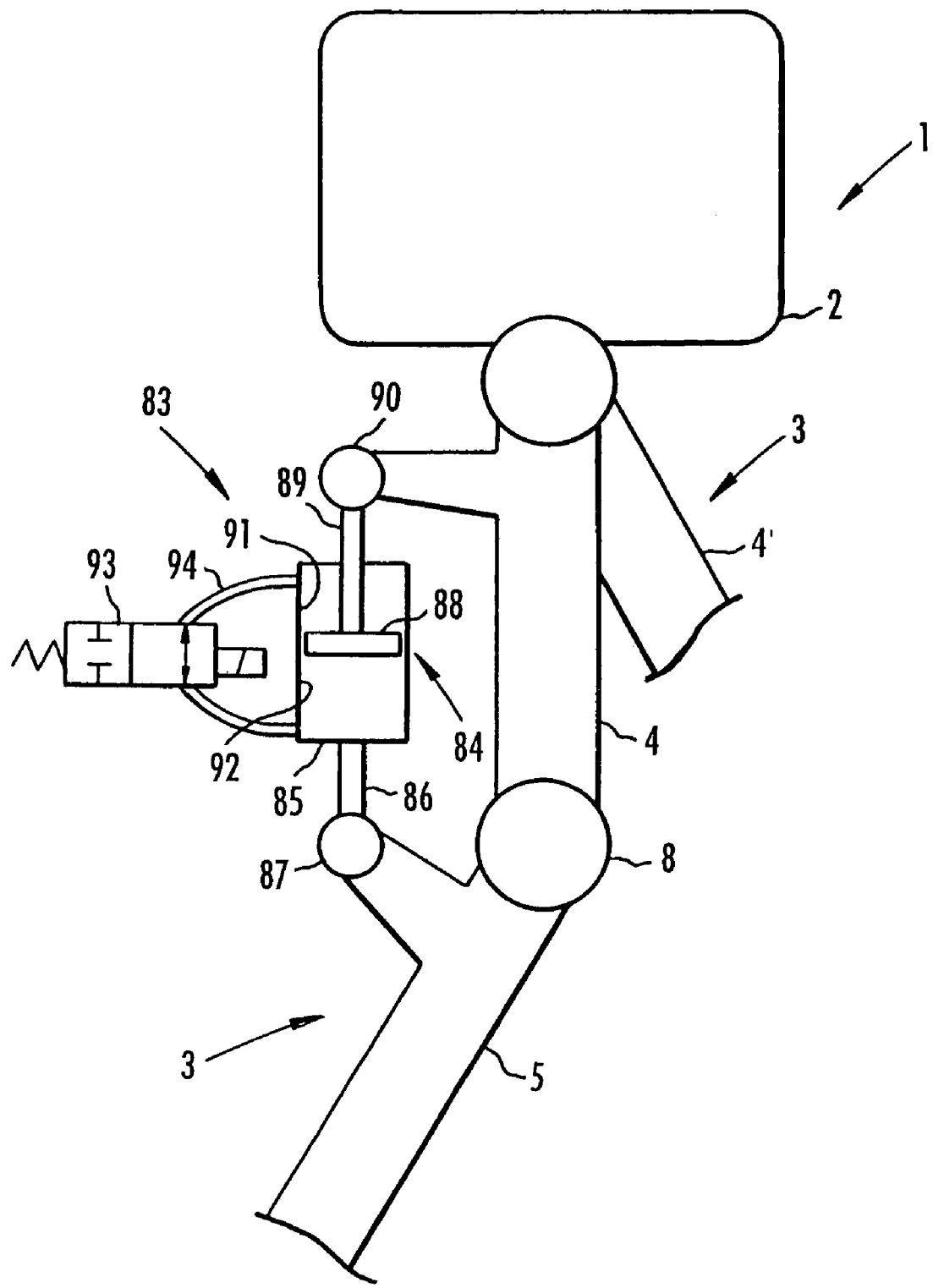
FIG. 21 is an explanatory view showing a configuration of an assist device in a tenth embodiment of the present invention.

As shown in FIG. 21, in an assist device 83 of this embodiment, a gas spring having a cylinder structure is provided as spring means 84. In this case, a connecting member 86 is fixed to the bottom portion of a cylinder (outer cylinder) 85. This connecting member 86 is connected to the crus portion 5 through a free joint 87. In addition, a piston rod 89 extends toward the upper side of the cylinder 85 from a piston 88 which is slidable within the cylinder 85 in the axis direction thereof. The end portion (upper end portion) of this piston rod 89 is connected to the thigh portion 4 through a free joint 90. Pressurized gas (air or the like) is filled in gas chambers 91 and 92 formed above and under the piston 88, respectively, within the cylinder 85. Further, these gas chambers 91 and 92 are connected to each other through a communicating pipe 94 having a switch valve 93. Here, the switch valve 93 is an electromagnetic switch valve which can switch between a close state and an open state. In the close state, communications between the gas chambers 91 and 92 are blocked. In the open state, these chambers are allowed to communicate with each other. The switch valve 93 corresponds to the motion transmission continuation/discontinuation means of the present invention.

In the assist device 83 having the above configuration, a state where the switch valve 93 is actuated to the open state and a state where the switch valve 93 is actuated to the close state correspond to the free state and the locked state in the foregoing first and second embodiments, respectively, similarly to the aforementioned ninth embodiment. Specifically, in the state where the switch valve 93 is actuated to the open state, the gas merely flows between the aforementioned gas chambers 91 and 92 in accordance with a movement of the piston 88 accompanying the knee bending and stretching motion of the leg 3. Thus, the spring means 84 does not generate the elastic force, and the elastic force by the spring means 84 does not act on the knee joint 8.

Further, in the state where the switch valve 93 is actuated to the close state, the gas in one of the gas chambers 91 and 92 is compressed and the gas in the other gas chamber is expanded due to the movement of the piston 88 at the same time accompanying the knee bending and stretching motion of the leg 3. Thus, the elastic force by the spring means 84 is generated. This elastic force then acts on the knee joint 8 of the leg 3 as the auxiliary knee rotation force.

The configurations other than the above-described configuration are the same as those of the foregoing first and second embodiments. In addition, control processing by the control unit 27 is the same as that of the foregoing first and second embodiments. In this case, however, the lock command transmitted by the lock mechanism controller 33 of the control unit 27 is a command directing the switch valve 93 to the close state, and the free command is a command directing the switch valve 93 to the open state, similarly to the case of the aforementioned ninth embodiment. Therefore, the system of this embodiment can achieve an effect of action similar to those of the foregoing first and second embodiments. In addition, in this embodiment, the spring means 84 is the gas spring. Therefore, free vibration of the spring means 84 hardly occurs in the shift from the locked state to the free state. Thus, the shift from the free state to the locked state thereafter can be performed smoothly, thereby generating the auxiliary knee rotation force smoothly.

Note that, in this embodiment, the pressurized gas is filled in both of the gas chambers 91 and 92 within the cylinder 85. However, for example, one of the gas chambers 91 and 92 may be opened to the atmosphere and the other chamber may be opened and closed to the atmosphere through a switch valve. Nevertheless, the configuration of the spring means in the aforementioned tenth embodiment is advantageous for achieving spring means which has a relatively small configuration and is enabled to generate relatively large auxiliary knee rotation force. Further, in this embodiment, the switch valve 93 is provided outside of the cylinder 85, but may be provided in the piston 88.

Next, an eleventh embodiment of the present invention is described with reference to FIGS. 22 and 23. Note that this embodiment is different from the foregoing first and second embodiments only in that the mechanical configuration of the assist device. Thus, reference numerals and figures the same as those for the first embodiment denote constituents and functional portions the same as those of the first embodiment, and a description thereof is omitted.

Figure 22:
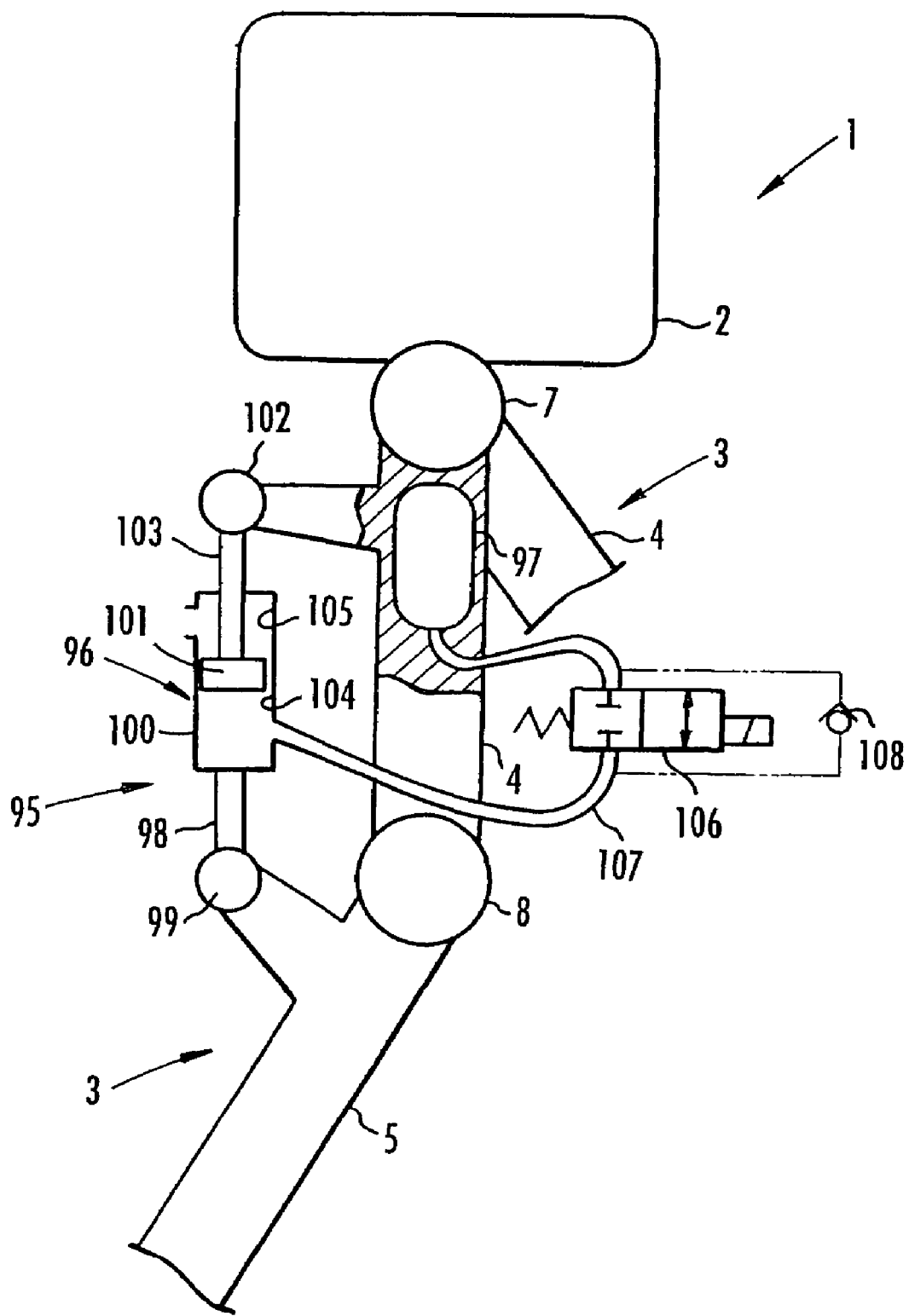
FIG. 22 is an explanatory view showing a configuration of an assist device in an eleventh embodiment of the present invention.
Figure 23:
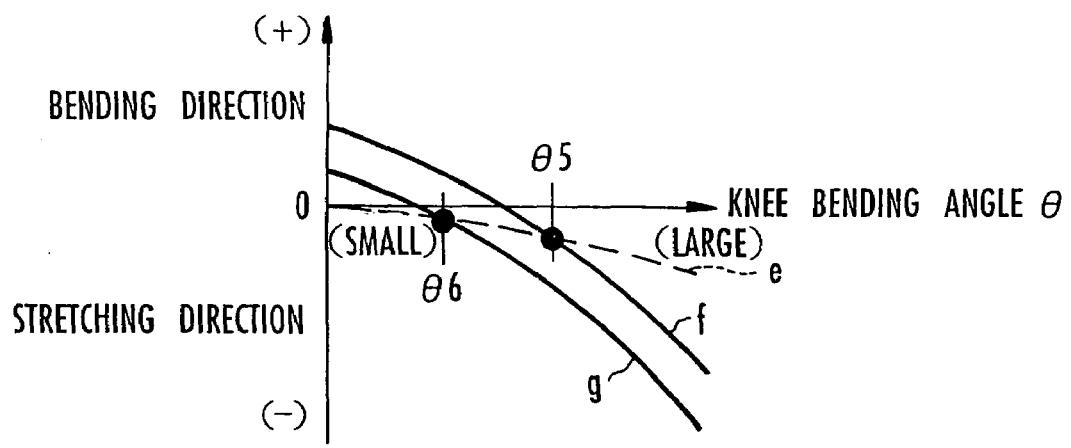
FIG. 23 is a diagram showing characteristics of spring means provided in the assist device in FIG. 22.

Referring to FIG. 22, an assist device 95 of this embodiment is provided with a gas spring having a cylinder structure as spring means 96, and an accumulator 97 storing pressurized gas.

The spring means 96 has a basic configuration and an attaching structure to the leg 3, which are similar to those of the spring means 84 of the aforementioned tenth embodiment. The spring means 96 is configured by a cylinder (outer cylinder) 100 whose bottom portion is connected to the crus portion 5 through a connecting rod 98 and a free joint 99, a piston 101 slidable within the cylinder 100 in the axis direction thereof, and a piston rod 103 extending from the piston 101 toward the upper side and connected to the thigh portion 4 through a free joint 102. Gas such as air is filled in a gas chamber 104 under the piston 101 (bottom part side of the cylinder 100) within the cylinder 100. A gas chamber 105 above the piston 101 is opened to the atmosphere. In this case, in the assist device 95 of this embodiment, the gas chamber 104 within the cylinder 100 is connected to the aforementioned accumulator 97 through a communicating pipe 107 having a switch valve 106. Here, the switch valve 106 is an electromagnetic switch valve which can switch between a close state and an open state. In the close state, communications between the gas chamber 104 within the cylinder 100 and the accumulator 97 is blocked. In the open state, the gas chamber 104 and the accumulator 97 are allowed to communicate with each other. The switch valve 106 corresponds to the motion transmission continuation/ discontinuation means of the present invention. Note that the pressure of the pressurized gas in the accumulator 97 is set to be slightly higher than the atmospheric pressure (pressure in the gas chamber 104). Further, when the switch valve 106 is in the open state, the pressure of the pressurized gas in the accumulator 97 is set to be almost equal to the atmospheric pressure, in a state where the knee bending angle θ is almost "0" (a state where the leg 3 is stretched straight) Furthermore, a check valve denoted by reference numeral 108 is related to a modified aspect of this embodiment, which will be described later.

In the assist device 95 having the above-mentioned configuration, a state where the switch valve 106 is actuated to the open state and a state where the switch valve 106 is actuated to the close state correspond to the free state and the locked state in the foregoing fist and second embodiments, respectively, similarly to the foregoing ninth or tenth embodiment. Specifically, in the state where the switch valve 106 is actuated to the open state, the gas flows between the gas chamber 104 within the cylinder 100 and the accumulator 97 in accordance with a movement of the piston 101 accompanying the knee bending and stretching motion of the leg 3. Thus, the spring means 96 does not generate large elastic force (auxiliary knee rotation force) However, in this embodiment, the pressure in the accumulator 97 communicating with the chamber 104 within the cylinder 100 is set as mentioned earlier in the free state. Therefore, as shown by a broken line e in FIG. 23, the spring means 96 generates relatively small elastic force (auxiliary knee rotation force) as the knee bending angle θ increases. Further, in the locked state (the close state of the switch valve 106), the pressure within the gas chamber 104 in the cylinder 100 increases/decreases in accordance with a movement of the piston 101 accompanying the knee bending and stretching motion of the leg 3. Thus, the spring means 96 generates relatively large auxiliary knee rotation force. As shown in FIG. 23, when the knee bending angles at the start time of the locked state (lock start knee bending angle) are, for example, θ5 and θ6, the characteristics of the auxiliary knee rotation force by the spring means 96 relative to the knee bending angle θ in the locked state, are the characteristics shown by solid line f and g, respectively.

The configurations other than the above-described configuration are the same as those of the foregoing first and second embodiments. In addition, control processing by the control unit 27 is the same as that of the foregoing first and second embodiments. However, in this case, similar to the case of the aforementioned ninth embodiment, the lock command transmitted by the lock mechanism controller 33 of the control unit 27 is a command directing the switch valve 106 to the close state, and the free command is a command directing the switch valve 106 to be in the open state.

In the system of this embodiment described above, the lock period is set similarly to the foregoing first and second embodiments, during the running motion of the robot 1. When the switch valve 106 is in the close state (locked state) in the lock period, a large auxiliary knee rotation force can be generated by the spring means 96 in accordance with the knee bending and stretching motion. Thus, the burden on the knee joint electric motor 10 can be further decreased. In this case, in this embodiment, an elastic force by the spring means 96 is generated even in the free state and acts on the knee joint 8. However, the elastic force is sufficiently small. Therefore, it is unlikely that the burden on the knee joint electric motor 10 is greatly increased in the free state.

Figure 24:
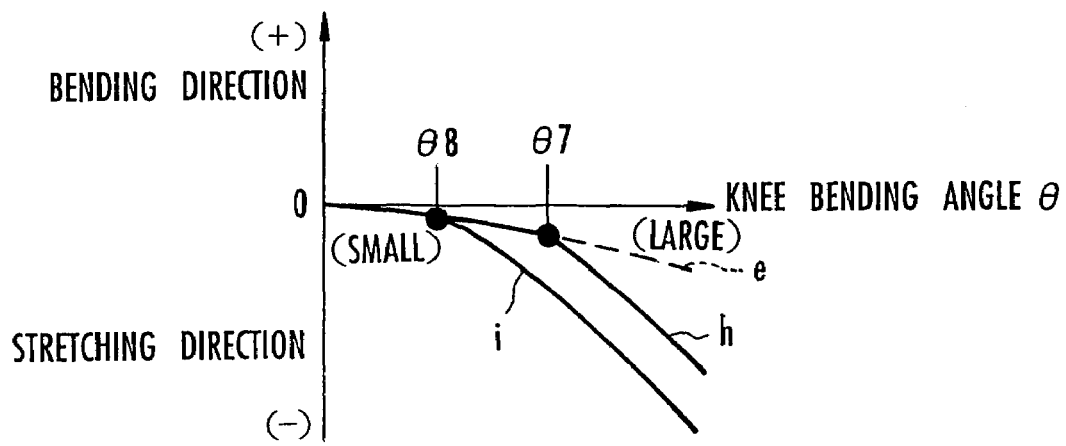
FIG. 24 is a diagram showing characteristics of spring means related to a modified aspect of the eleventh embodiment.

Note that, in this embodiment, as shown by an imaginary line in FIG. 22, the check valve 108 may be connected in parallel with the switch valve 106. In the case where the check valve 108 is provided as above, when the knee bending angle θ becomes smaller than the knee bending angle at the start time of the locked state (lock start knee bending angle) in the locked state in which the switch valve 106 is directed to the close state, a state the same as the free state is produced. Thus, the characteristics of the auxiliary knee rotation force by the spring means 96 relative to the knee bending angle θ in the close state of the switch valve 106, are the characteristics shown by solid lines h and i in FIG. 24 (θ7 and θ8 are the lock start knee bending angles). Specifically, when the knee bending angle θ is smaller than the lock start knee bending angles θ7 and θ8, the characteristics of the auxiliary knee rotation force by the spring means 96 are the same as the characteristics shown by the broken line e in the aforementioned FIG. 23. When the knee bending angle θ is larger than the lock-start knee bending angles θ7 and θ8, the characteristics of the auxiliary knee rotation force by the spring means 96 are similar to the characteristics shown by the solid lines f and g of the aforementioned FIG. 23. In this case, when the knee bending angle θ is smaller than the lock start knee bending angles θ7 and θ8, the auxiliary knee rotation force by the spring means 96 is sufficiently small. Thus, an effect of action similar to those of the foregoing third and fourth embodiments can be achieved.

Figure 25:
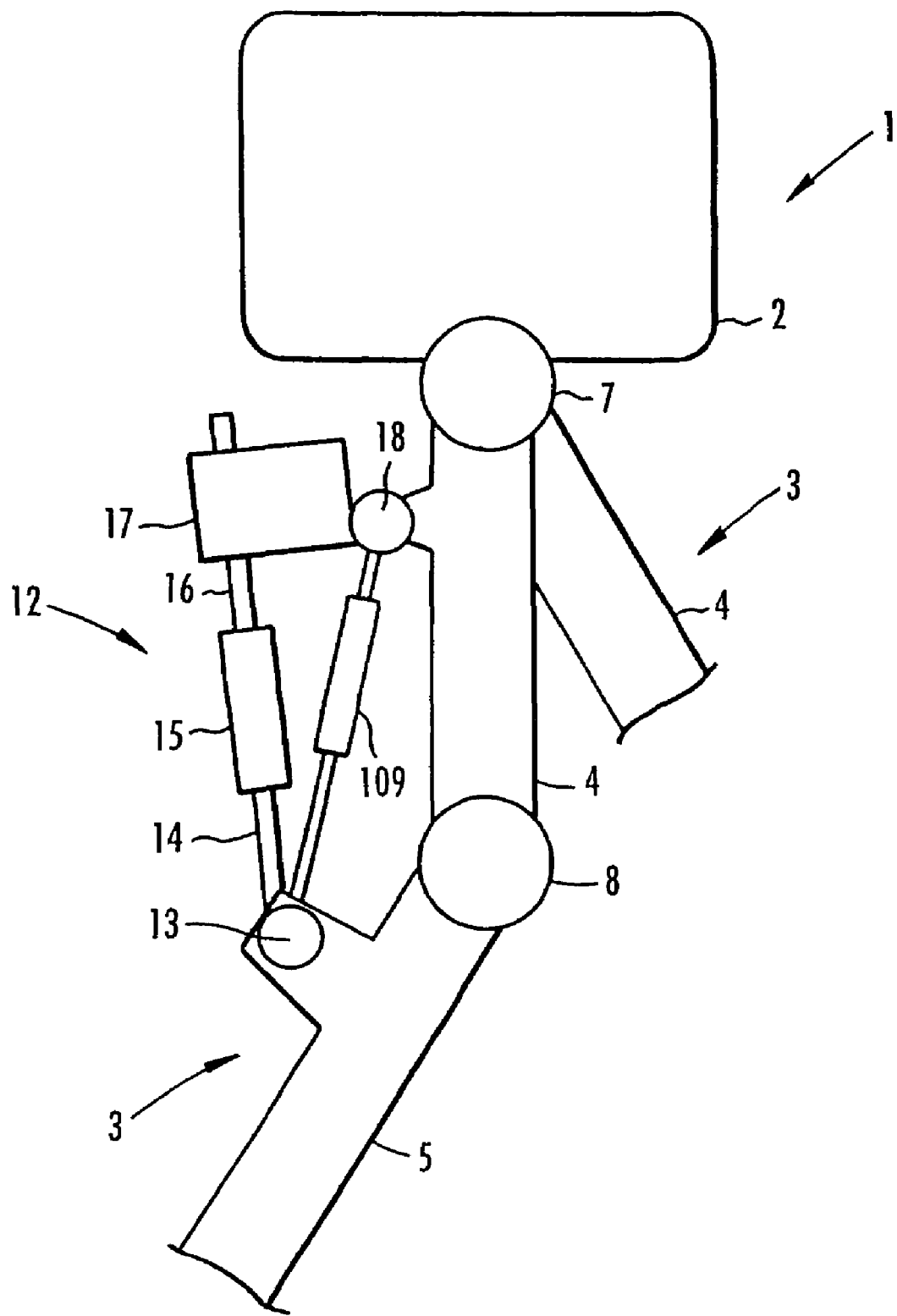
FIG. 25 is an explanatory view showing a configuration of an assist device in a twelfth embodiment of the present invention.

Moreover, as shown in FIG. 25, the system having a function equal to that of the system in this embodiment (hereinafter, referred to as a twelfth embodiment) can be realized by connecting the free joints 13 and 18 using a spring 109 (which may be any of a solid spring and a gas spring) with a relatively small elastic force, in the system shown in FIG. 1 (a system related to the foregoing first to four the embodiments). Here, in FIG. 25, portions the same as those of FIG. 1 are denoted by the same reference numerals. Note that, in order to provide this embodiment (the twelfth embodiment) with the function equal to that of the aforementioned eleventh embodiment, it is required to allow the spring 109 to constantly generate an elastic force in the stretching direction of the leg 3. However, it is also possible to allow the spring 109 to generate the elastic force in the bending direction of the leg 3, which is an opposite direction to the stretching direction of the same (however, the elastic force is sufficiently smaller than the elastic force by the spring means 15 in the locked state). In this case, the burden on the knee joint electric motor 10 can be reduced, for example, in the free leg period of the leg 3.

Next, a thirteenth embodiment of the present invention is described with reference to FIGS. 26 and 27. Note that this embodiment is different from the foregoing first and second embodiments only in the mechanical configuration of the assist device. Thus, reference numerals and figures the same as those for the first embodiment denote constituents and functional portions the same as those of the first embodiment, and a description thereof is omitted.

Figure 26:
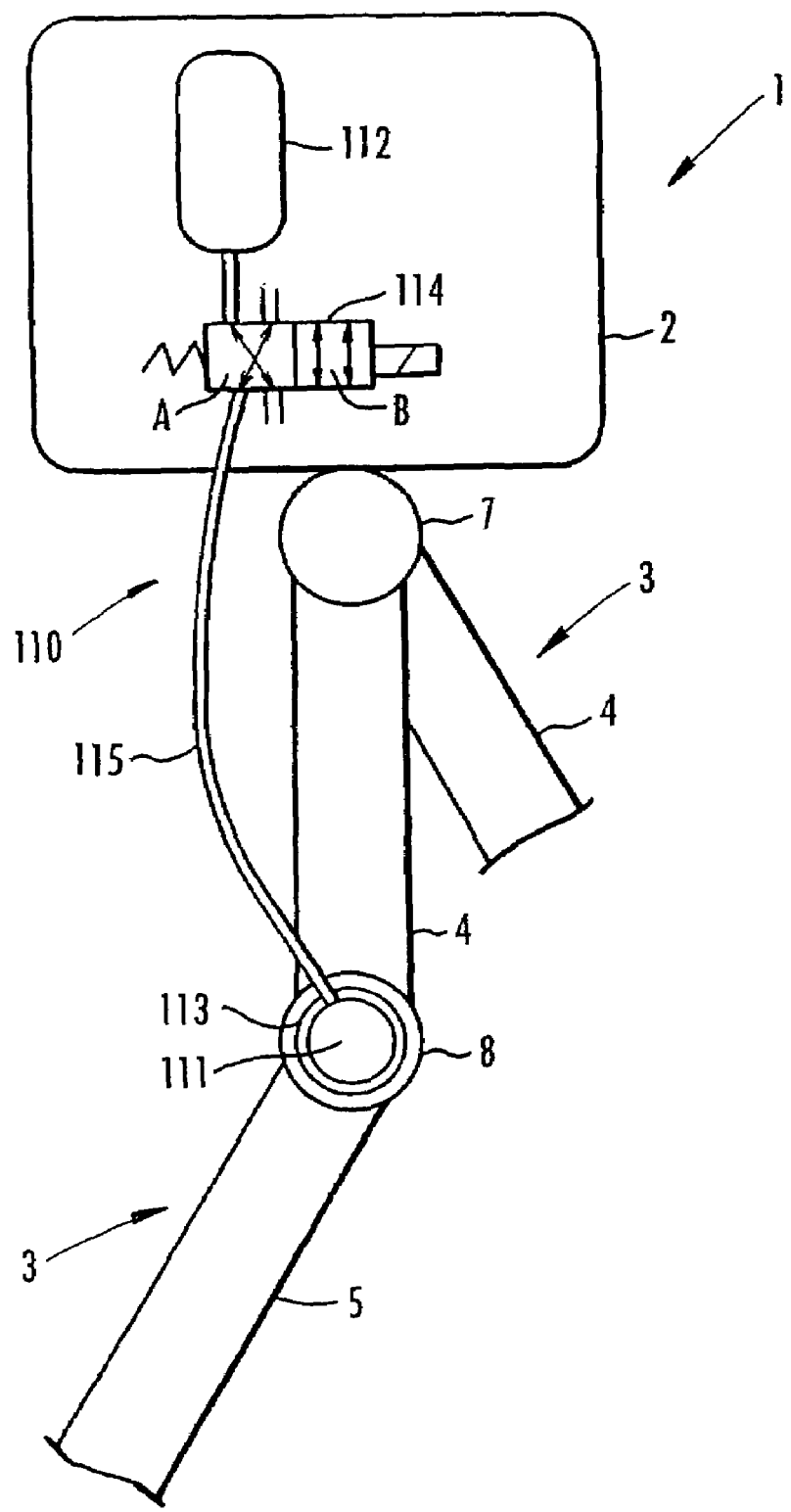
FIG. 26 is an explanatory view showing a configuration of an assist device in a thirteenth embodiment of the present invention.
Figure 27:
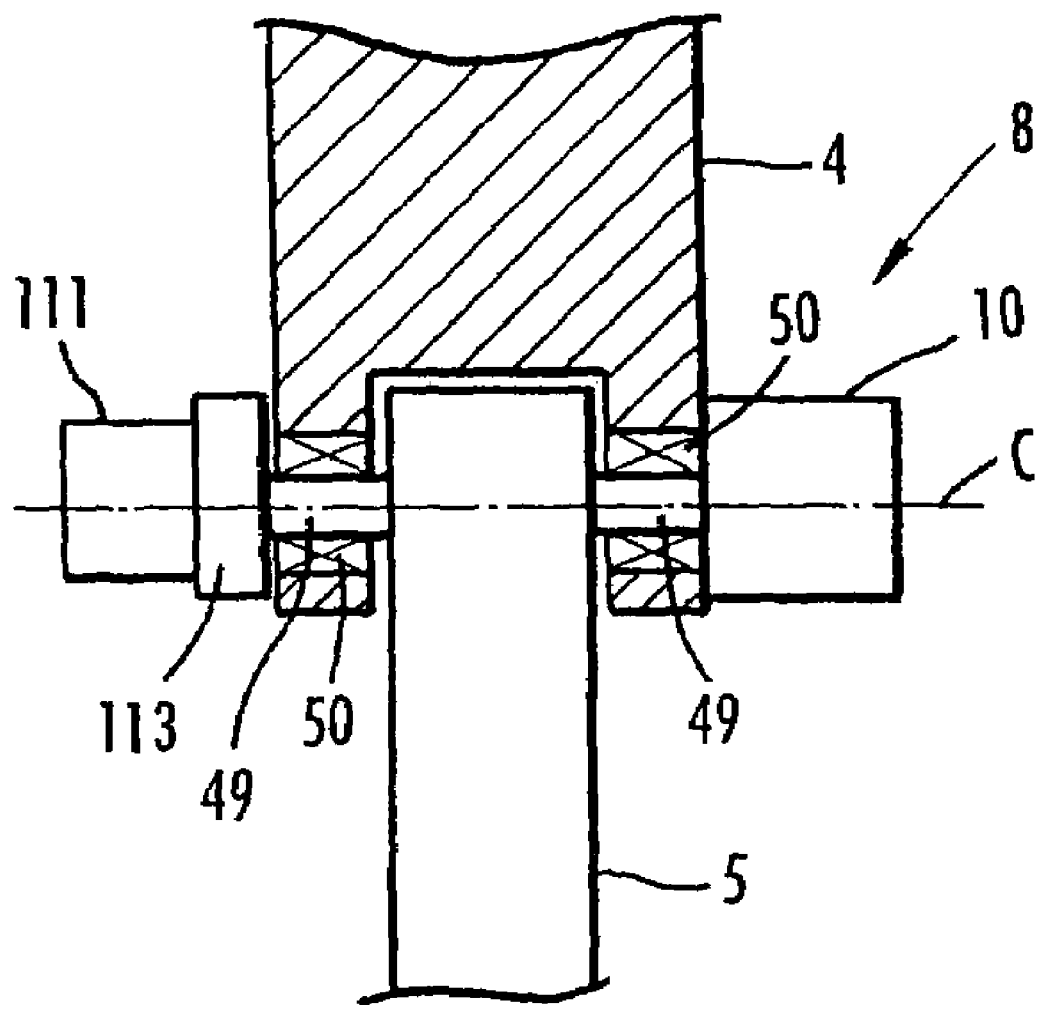
FIG. 27 is a cross sectional view showing a configuration of an essential part of the assist device in FIG. 26.

Referring to FIG. 26, an assist device 110 of this embodiment is provided with an air motor (pump) 111 as the spring means, and an accumulator 112 storing pressurized gas. As shown in FIG. 27, the rotating shaft (not shown) of the air motor 111 is connected to the crus portion 5 through a speed reducer 113. Specifically, the rotating shaft portion 49 of the crus portion 5 is rotatably supported by the thigh portion 4 through the bearing 50, similarly to the case of the foregoing sixth embodiment. Additionally, the end of the rotating shaft portion 49, projecting to the outside of the thigh portion 4, is connected to the output side of the speed reducer 113, and the input side of the speed reducer 113 is connected to the rotating shaft (not shown) of the air motor 111. Here, the speed reducer 113 is for increasing the rotation speed of the air motor 111 to be faster than the rotation speed of the rotating shaft portion 49 of the crus portion 5. Note that, although not illustrated in detail, the case of the air motor 111 is fixed to the thigh portion 4. Further, the air motor 111 is a positive-displacement motor which is, for example, a vane type motor or a swash plate type motor.

The air outlet of the air motor 111 is connected to the aforementioned accumulator 112 through a communicating pipe 115 having a switch valve 114 which corresponds to the motion transmission continuation/discontinuation means of the present invention. Here, the switch valve 114 is an electromagnetic switch valve which can switch between a position A and a position B. At the position A, the air outlet of the air motor 111 and the accumulator 112 are opened to the atmosphere. At the position B, the air outlet of the air motor 111 and the accumulator 112 are allowed to communicate with each other. Note that, the air inlet of the air motor 111 is opened to the atmosphere.

In the assist device 110 having the above-described configuration, similar to the foregoing ninth and tenth embodiments, the state where the switch valve 114 is actuated to be at the position A and the state where the switch valve 114 is actuated to be at the position B correspond to the free state and the locked state in the foregoing first and second embodiments, respectively. Specifically, in the state where the switch valve 114 is actuated to be at the position A, the pressure within the air motor 111 does not rise by rotation of the rotating shaft of the air motor 111 due to the knee bending and stretching motion of the leg 3. Thus, the auxiliary knee rotation force does not act on the knee joint 8.

Meanwhile, in the state where the switch valve 114 is actuated to the position B, air is pressured and sent to the accumulator 112 by the rotation of the rotating shaft of the air motor 111 accompanying the knee bending and stretching motion of the leg 3, increasing the pressure of the air. Thus, the auxiliary knee rotation force acts on the knee joint 8 through the rotating shaft of the air motor 111 and the foregoing speed reducer 113.

The configurations other than the above-described configuration are the same as those of the foregoing first and second embodiments. In addition, control processing by the control unit 27 is the same as that of the foregoing first and second embodiments. In this case, however, the lock command transmitted from the lock mechanism controller 33 of the control unit 27 is a command causing the switch valve 114 to be at the position B, and the free command is a command causing the switch valve 114 to be at the position A. Therefore, the system of this embodiment can realize an effect of action similar to those of the foregoing first and second embodiments.

Note that, when, for example, a swash plate type variable displacement motor (pump) is used as the air motor 111 in the assist device 110 having the configuration like the one shown in this embodiment, the spring constant of the air motor 111 serving as the spring means can be changeable by adjusting the volume of the motor. The changeable spring constant of the spring means is feasible not only in the assist device of this embodiment but also in those of the first to twelfth embodiments. For example, in the assist device having the configuration shown in FIG. 14, the connecting member 46 or the like may be expanded/contracted and the length thereof (more strictly, the distance between the free joint 45, a point of action of the force by the spring means 15, and the center of rotation of the knee joint 8) is adjusted. Thus, the spring constant of the spring means 15 can be changeable. This can be applied to those shown in FIGS. 1, 13, and 25. Moreover, in the assist device provided with the speed reducer 56 as the one shown in FIG. 16, a variable-speed speed reducer is employed and the speed reducing ratio thereof is adjusted, thereby adjusting the spring constant. Furthermore, for example, in the assist device provided with the cam 59 as the one shown in FIG. 18, the spring constant can be adjusted by providing cams having different cam shapes from each other and providing means for switching between these cams. Yet further, for example, in the assist device provided with the accumulator 97 as the one shown in FIG. 22, a plurality of accumulators are provided. These accumulators communicate with each other and the communication therebetween can be blocked, through an open-close valve or the like. Thus, the effective capacity of the accumulators as a whole is adjusted, and thereby the spring constant can be adjusted. Yet further, for example, in the assist device like the one shown in FIG. 21, in which gas related to the spring means is sealed, the spring constant can be adjusted by changing the pressure of the gas by the use of an external pump or the like.

Note that, in each of the first to thirteenth embodiments described so far, the assist device has been described, which causes the auxiliary knee rotation force by the spring means to act on the knee joint 8 of the leg 3 as appropriate. However, the assist device of the present invention can also be applied to the ankle joint 9 and the hip joint 7 of the leg 3. Moreover, the present invention can be applied not only to the robot with legs, each having only the hip joint, the knee joint, and the ankle joint as the joints thereof, but also to a robot having more joints. In addition, the present invention can be applied not only to the biped mobile robot, but also to a robot having more than or equal to three legs.

Moreover, in each of the foregoing embodiments, the assist device was shown, in which the auxiliary knee rotation force by the spring means is generated as appropriate during the running motion of the robot 1. However, the assist device is not limited to the above. The present invention may also be applied for a gait in ascent and decent of stairs or the like, which causes a situation where a driving force to be generated to a joint becomes relatively large.

Moreover, in the assist device as the one shown in FIG. 21, provided with the spring means 84, which is an air spring, and the switch valve 93, it is possible to provide a cam at the knee joint so that the knee bending and stretching motion is transmitted to the spring means 84 by the cam. In this case, it is also possible to accommodate the spring means 84 within the thigh portion 4.

Furthermore, the spring means of the present invention may be configured by connecting a plurality of solid springs or gas springs in series.

INDUSTRIAL APPLICABILITY

As hitherto described, the present invention is useful as it can reduce the burden on the joint actuator while the legged mobile robot such as the biped mobile robot is moving, thereby providing the legged mobile robot with less energy loss.

What is claimed is:

1. A leg joint assist device for generating an auxiliary driving force on a specific joint of a legged mobile robot in parallel with a driving force of a joint actuator driving the specific joint, the robot comprising a plurality of legs, extending from a body, configured by connecting a plurality of link members sequentially from a body side through the plurality of joints, wherein at least one joint amongst a plurality of the joints of each of a plurality of the legs is defined as the specific joint in the legged mobile robot, the leg joint assist device comprising:

spring means, provided to be able to transmit a relative displacement motion of a pair of the link members connected by the specific joint, the relative displacement motion being caused by actuation of the specific joint, for generating the auxiliary driving force while storing elastic energy in synchronization with the relative displacement motion in a state where transmission of the relative displacement motion is continued, and for restoring a state where the elastic energy is released in a state where transmission of the relative displacement motion is discontinued;

motion transmission continuation/discontinuation means for continuing and discontinuing transmission of the relative displacement motion of the pair of link members to the spring means; and control means for controlling continuation/discontinuation of transmission of the relative displacement motion to the spring means by the motion transmission continuation/discontinuation means, depending on a state of motion of each of the legs.

2. The leg joint assist device according to claim 1, wherein the control means controls the motion transmission continuation/discontinuation means to discontinue transmission of the relative displacement motion of the pair of link members to the spring means at least during a first predetermined period in a state where each of the legs is lifted off a floor.

3. The leg joint assist device according to claim 1, wherein, while the legged mobile robot is moving with a predetermined gait which has been decided in advance, the control means controls the motion transmission continuation/discontinuation means to continue transmission of the relative displacement motion of the pair of link members to the spring means at least during a second predetermined period in a state where each of the legs lands on the floor.

4. The leg joint assist device according to claim 3, wherein the second predetermined period in the state where each of the legs lands on the floor is determined such that relative displacement amounts between the pair of link members at start time and stop time of the second predetermined period are approximately equal.

5. The leg joint assist device according to claim 3, comprising means for controlling a driving force of the joint actuator such that, while the motion transmission continuation/discontinuation means is continuing transmission of the relative displacement motion of the pair of link members to the spring means, a sum of the auxiliary driving force by the spring means and the driving force of the joint actuator becomes a desired driving force determined to follow a desired gait of the legged mobile robot.

6. The leg joint assist device according to claim 5, wherein the means for controlling the driving force of the joint actuator estimates the auxiliary driving force by the spring means based on a variation of the relative displacement amount between the pair of link members from the start time of the second predetermined period and characteristic data of the auxiliary driving force of the spring means, which is obtained in advance.

7. The leg joint assist device according to claim 1, wherein the spring means is a gas spring which elastically generates the auxiliary driving force by compression or expansion of gas.

8. The leg joint assist device according to claim 1, wherein the joint actuator is an electric motor.

9. The leg joint assist device according to claim 2, wherein, while the legged mobile robot is moving with a predetermined gait which has been decided in advance, the control means controls the motion transmission continuation/discontinuation means to continue transmission of the relative displacement motion of the pair of link members to the spring means at least during a second predetermined period in a state where each of the legs lands on the floor.

10. The leg joint assist device according to claim 9, wherein the second predetermined period in the state where each of the legs lands on the floor is determined such that relative displacement amounts between the pair of link members at start time and stop time of the second predetermined period are approximately equal.

11. The leg joint assist device according to claim 9, comprising means for controlling a driving force of the joint actuator such that, while the motion transmission continuation/discontinuation means is continuing transmission of the relative displacement motion of the pair of link members to the spring means, a sum of the auxiliary driving force by the spring means and the driving force of the joint actuator becomes a desired driving force determined to follow a desired gait of the legged mobile robot.

12. The leg joint assist device according to claim 11, wherein the means for controlling the driving force of the joint actuator estimates the auxiliary driving force by the spring means based on a variation of the relative displacement amount between the pair of link members from the start time of the second predetermined period and characteristic data of the auxiliary driving force of the spring means, which is obtained in advance.

13. The leg joint assist device according to claim 9, wherein the spring means is a gas spring which elastically generates the auxiliary driving force by compression or expansion of gas.

14. The leg joint assist device according to claim 9, wherein the joint actuator is an electric motor.

\* \* \* \* \*